United States Patent
Malboubi et al.

(10) Patent No.: US 12,069,555 B2
(45) Date of Patent: **\*Aug. 20, 2024**

(54) INTELLIGENT SUPPORT FRAMEWORK USABLE FOR ENHANCING RESPONDER NETWORK

(71) Applicant: AT&T Intellectual Property I, L.P., Atlanta, GA (US)

(72) Inventors: Mehdi Malboubi, San Ramon, CA (US); Raghvendra Savoor, Walnut Creek, CA (US); Baofeng Jiang, Pleasanton, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/296,111

(22) Filed: Apr. 5, 2023

(65) Prior Publication Data
US 2023/0262439 A1 Aug. 17, 2023

Related U.S. Application Data

(63) Continuation of application No. 17/463,174, filed on Aug. 31, 2021, now Pat. No. 11,647,374.

(51) Int. Cl.
*H04W 4/90* (2018.01)
*H04W 8/08* (2009.01)
(Continued)

(52) U.S. Cl.
CPC ............ *H04W 4/90* (2018.02); *H04W 8/08* (2013.01); *H04W 24/08* (2013.01); *H04W 28/0268* (2013.01); *H04W 64/00* (2013.01)

(58) Field of Classification Search
None
See application file for complete search history.

(56) References Cited

U.S. PATENT DOCUMENTS

2010/0269143 A1\* 10/2010 Rabowsky ......... H04B 7/18591
725/63
2022/0321198 A1 10/2022 Devoti et al.

OTHER PUBLICATIONS

Notice of Allowance received for U.S. Appl. No. 17/463,174 dated Jan. 5, 2023, 27 pages.

(Continued)

*Primary Examiner* — Suhail Khan
(74) *Attorney, Agent, or Firm* — GUNTIN & GUST, PLC; Mark Wilinski

(57) ABSTRACT

Resources associated with a responder communication network and a communication network can be managed in an effective manner. In connection with an event, a resource management component (RMC) can analyze network-related data associated with the networks and external data relating to the event or a geographic area related thereto. In connection with the event, based on the analysis, RMC can desirably manage the resources, in part, by determining locations or adjustments for portable base stations, sensors, and/or devices associated with the responder communication network to facilitate high quality communication of information, determining traffic routes and other path planning for vehicles or personnel, creating network slices for high quality communication of information, and/or performing monitoring and intelligent troubleshooting with regard to the networks. RMC can employ artificial intelligence or machine learning techniques and models to facilitate making desired predictions or inferences relating to the event or networks.

20 Claims, 12 Drawing Sheets

(51) Int. Cl.
    *H04W 24/08*     (2009.01)
    *H04W 28/02*     (2009.01)
    *H04W 64/00*     (2009.01)

(56) References Cited

OTHER PUBLICATIONS

FirstNet, https://www.firstnet.com/, accessed Aug. 31, 2021, 1 pages.
FirstNet Authority, https://firstnet.gov/, accessed Aug. 31, 2021, 1 pages.
Wilkers, "AT&T adding 5G to FirstNet public safety network," Washington Technology, https://washingtontechnology.com/articles/2021/04/02/att-firstnet-5g-security.aspx, Apr. 2, 2021, 6 pages.

* cited by examiner

INTELLIGENT SUPPORT FRAMEWORK USABLE FOR ENHANCING RESPONDER NETWORK

RELATED APPLICATION

The subject patent application is a continuation of, and claims priority to, U.S. patent application Ser. No. 17/463,174, filed Aug. 31, 2021, and entitled "INTELLIGENT SUPPORT FRAMEWORK USABLE FOR ENHANCING RESPONDER NETWORK," the entirety of which priority application is hereby incorporated by reference herein.

TECHNICAL FIELD

This disclosure relates generally to electronic communications, e.g., to an intelligent support framework usable for enhancing a responder network.

BACKGROUND

Disasters, emergency events, and other types of events can occur in various locations. First responders and other personnel (e.g., event support personnel) can respond to such events to manage such events, combat harmful conditions associated with the events, provide assistance or care to people, animals, or property affected by the events, and/or mitigate or prevent harm or potential harm to people, animals, or property, and costs that can be associated with such harm or potential harm. During an event, first responders and other personnel can utilize communication devices, including wireless communication devices, communication networks, and communication technology to communicate with each other during the event to coordinate the response of the first responders and other personnel to the event.

The above-described description is merely intended to provide a contextual overview regarding electronic communications, and is not intended to be exhaustive.

DETAILED DESCRIPTION

Figure 1:
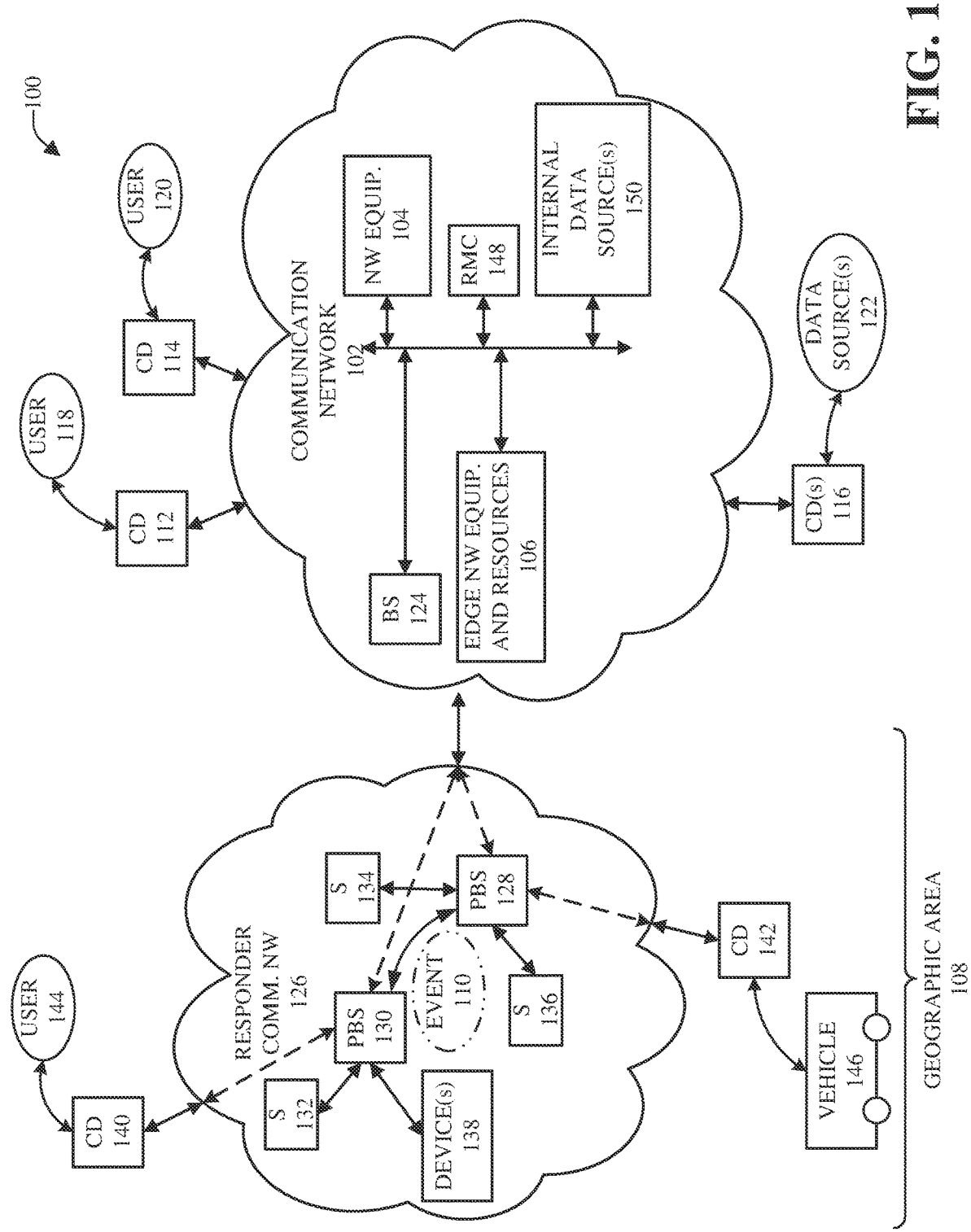
FIG. 1 illustrates a block diagram of an example system that can desirably manage resources associated with a responder communication network and/or a communication network, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Discussed herein are various aspects and embodiments that relate to desirably (e.g., improvedly, suitably, acceptably, efficiently, effectively, and/or optimally) managing resources associated with a responder communication network and a communication network. The disclosed subject matter can manage the resources of or associated with the responder communication network and/or communication network to facilitate desirably (e.g., improvedly, suitably, acceptably, or optimally) Resources associated with a responder communication network and a communication network can be managed in an efficient and effective manner. In connection with an event, a resource management component (RMC) can analyze network-related data associated with the responder and/or communication networks, external data relating to the event or a geographic area related thereto, and/or other relevant information. In connection with the event, based at least in part on the results of the analysis, the RMC can desirably manage the resources, for example, by determining locations or adjustments for portable base stations, sensors, and/or devices associated with the responder communication network to facilitate high quality communication of information associated with the responder and/or communication networks, determining traffic routes and other path planning for vehicles or personnel with regard to the geographic area, creating and managing network slices for high quality communication of information associated with the responder and/or communication networks, performing monitoring and intelligent troubleshooting with regard to the responder and/or communication networks, and/or performing other desired operations to facilitate responding to the event, as more fully described herein. In some embodiments, the RMC can employ artificial intelligence (AI) or machine learning (ML) techniques and models to facilitate making desired predictions or inferences relating to the event, resources, and/or the responder and/or communication networks, such as more fully described herein.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 2G, 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. Accordingly, systems, methods, and/or machine-readable storage media for reducing interference on reference signals from other co-channel reference signals, and improving the channel estimation performance for CSI estimation and data detection, in 5G systems, and other next generation systems, can be desired. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also will employ massive MIMO systems (e.g., hundreds of antennas at the transmitter side and receiver side). Typically, with a ($N_t$, $N_r$), where $N_t$ denotes the number of transmit antennas and $N_r$ denotes the number of receive antennas, the peak data rate can multiply with a factor of $N_t$ over single antenna systems in a rich scattering environment.

With further regard to the disclosed subject matter, disasters, emergency events, and other types of events can occur in various locations. First responders (e.g., law enforcement personnel, firefighter personnel, medical personnel, disaster response personnel, hazmat personnel, or other types of first responders) and other personnel (e.g., event support personnel) can respond to such events to manage such events, address or combat harmful conditions associated with the events, provide assistance or care to people, animals, or property affected by the events, and/or mitigate or prevent harm or potential harm to people, animals, or property, and costs that can be associated with such harm or potential harm. During an event, first responders and other personnel can utilize communication devices (e.g., wireless or wireline phones (e.g., smart phones), computers, electronic tablets, drones, robotic devices, electronic wearable devices (e.g., electronic watches, electronic eyeglasses, or other type of electronic wearable devices), or other type of communication device), communication networks, and communication technology to communicate with each other during the event to coordinate the response of the first responders and other personnel to the event.

Unfortunately, the number of disasters, emergency events, and other events are increasing due to various reasons, including, for example, climate change and unpredictable pandemics. For effective and efficient management of, and response to, these events, it can be desirable (e.g., useful, wanted, needed, or required) to have efficient communication infrastructures and supportive functionalities that can provide desirably high quality of service (QoS), quality of experience (QoE), and bandwidth to first responders and other personnel, and facilitate coordinating between different entities (e.g., personnel, organizations, or other type of entity) in real time or near real time.

To that end, techniques for desirable management of resources, including resources associated with a responder communication network and a communication network, are presented. The disclosed techniques for desirable (e.g., suitable, efficient, effective, and/or optimal) management of resources can facilitate (e.g., enable) effective and efficient management of, and response to various types of events (e.g., disasters, emergency events, or other type of event).

The disclosed subject matter can comprise the RMC to facilitate managing the resources, wherein the RMC can be part of or associated with the communication network. The RMC also can be associated with (e.g., communicatively connected to) a responder communication network (e.g., a first responder communication network or other communication network) that can be utilized (e.g., along with the communication network) to respond to events. In some embodiments, the responder communication network can be different than and/or separate from the communication network. The responder communication network can comprise or be associated with various components or devices, including, for example, portable or mobile base stations (e.g., portable or mobile access points) and associated cells, sensors (e.g., environmental sensors or other type of sensor), and/or communication devices (e.g., drones, robotic devices, mobile or smart phone, wearable electronic devices, Internet of Thing (IoT) devices, or other type of communication device). A portable base station can be mobile (e.g., movable) and configurable, and can be deployed in a desired location of a geographic area in connection with an event to provide one or more services, including communication services (e.g., wireless communication services) in or associated with the geographic area associated with the event. Sensors and/or communication devices can be deployed or distributed in desired locations in or associated with the geographic area, and can be associated with (e.g., communicatively connected to) the responder communication network and/or the communication network. One or more other communication devices (e.g., communication devices of users) also can be associated with the communication network.

In connection with an event, the RMC can receive first communication-related information associated with network equipment of the responder communication network and/or condition-related information from the responder communication network, second communication-related information associated with network equipment of the communication network from the communication network, other information (e.g., internal information stored in the communication network), and/or external information from a group of external data sources, wherein the external information can be determined to be relevant to the event. The condition-related information can comprise environmental condition-related or other condition-related information in or associated with a geographic area (e.g., a geographic region) associated with the event. The condition-related information can be received from the sensors and/or communication devices (e.g., drones, robotic devices, communication devices of users, such as first responders), and can relate to or indicate environmental conditions or other conditions in or associated with the geographic area associated with the event. In some embodiments, the sensors and/or communication devices associated with the responder communication network can be associated with one or more portable base stations of the responder communication network, and can communicate the condition-related information to the communication network and associated RMC via the one or more portable base stations. The communication network can receive the external information from one or more external data sources and can comprise, for example, weather information associated with a weather information source, geographic or map information associated with a geographic or map information source, traffic information associated with a traffic information source, unmanned traffic management (UTM) information associated with a UTM information source, and/or other desired information that can be determined to be pertinent or related to the event.

The RMC can analyze the first communication-related information, the condition-related information, the second communication-related information, the other information (e.g., internal information), the external information, and/or historical information (e.g., historical information relating to previous events, communication conditions, environmental conditions, other types of conditions, portable base stations, sensors, communication devices, geographic areas, first responders, or other historical information). Based at least in part on the results of the analysis, the RMC can manage the resources (e.g., one or more portable base stations, sensors, communication devices, network slices, computing resources, power resources, personnel, or other resources) associated with the responder communication network and/or the communication network, in connection with the event.

For instance, in connection with the event, based at least in part on the results of the analysis, the RMC can determine a desirable number of portable base stations to deploy in or associated with the geographic area and/or respective desirable (e.g., suitable or optimal) locations to deploy one or more portable base stations in or associated with the geographic area. For example, the RMC can determine respective locations to place one or more portable base stations in or associated with the geographic area to facilitate (e.g., enable) the one or more portable base stations to provide desirable (e.g., efficient, reliable, suitable, and/or optimal) communication services for the responder communication network to facilitate desirable communications between the sensors and/or communication devices associated with the responder communication network and the RMC and/or communication devices associated with the communication network. Also, based at least in part on the results of the analysis, the RMC can determine whether a modification is to be made to a location, base station parameter, or other configuration of a portable base station to enhance the performance of the portable base station in connection with the event.

In some embodiments, in connection with the event, based at least in part on the analysis results, the RMC can determine a desirable number of sensors and/or devices (e.g., drones, robotic devices, or other communication or IOT devices) to deploy in or associated with the geographic area and/or respective desirable (e.g., suitable or optimal)

locations to deploy one or more sensors and/or devices in or associated with the geographic area. As an example, the RMC can determine respective locations of one or more sensors and/or one or more devices in or associated with the geographic area to enable the one or more sensors to desirably (e.g., efficiently, reliably, suitably, and/or optimally) sense (e.g., detect) conditions (e.g., environmental conditions or other conditions) associated with the geographic area and/or to enable the one or more devices to desirably capture or sense information (e.g., condition-related information or other information) relating to the geographic area and/or event, and communicate information (e.g., sensor information generated by the sensors and/or captured information generated by the communication devices) to the RMC and/or other communication devices associated with the communication network via the one or more portable base stations associated with the responder communication network. The information captured or sensed by a device can comprise, for example, digital images, infrared images, heat map information, or other desired information. Also, based at least in part on the analysis results, the RMC can determine whether a modification is to be made to a location, parameter, or other configuration of a sensor or communication device to enhance the performance of the sensor or communication device in connection with the event.

In certain embodiments, based at least in part on the analysis results, the RMC also can determine desirable travel routes for personnel (e.g., first responders or other personnel) and/or vehicles (e.g., first responder vehicles or other vehicles) to travel to enable the personnel and/or vehicles to efficiently and reliably get to the geographic locations in or associated with the geographic area in connection with the event, so that the personnel can provide their services (e.g., provide firefighting services, law enforcement services, medical services, or other services) and/or so that the personnel are able to desirably utilize communication devices or other equipment in connection with providing their services.

In some embodiments, based at least in part on the analysis results, the RMC can determine, generate, or instantiate, or facilitate generating or instantiating, a desirable slice (e.g., vertical or horizontal network, core, or service slice) associated with the communication network to a communication device associated with the responder communication network or communication network to enable the communication device to desirably (e.g., securely, efficiently, reliably, suitably, and/or optimally) communicate information (e.g., information relating to the event) to another communication device associated with the slice (e.g., another communication device associated with the network or service slice, and associated with the communication network and/or a service network that can be associated with the communication network).

In certain embodiments, the RMC can build (e.g., construct or create), import, and/or use AI or ML techniques, models, and/or algorithms to manage or facilitate managing the resources (e.g., one or more portable base stations, sensors, communication devices, network slices, computing resources, power resources, personnel, or other resources) associated with the responder communication network and/or the communication network, in connection with the event. For example, the RMC can perform (and/or can employ an AI component to perform) an AI or ML analysis on the first communication-related information, the condition-related information, the second communication-related information, the other information (e.g., internal information), the external information, and/or the historical information to learn (e.g., self-learn), infer, predict, identify, or determine desirable utilization of the resources (e.g., location of resources, configuration of resources, an amount of resources, or other management of use of resources) in connection with the event. Based at least in part on the results of the AI or ML analysis performed on such information, the RMC can manage the use, deployment, or routing of resources, location of resources, routing of personnel and vehicles, configuration of resources, use or configuration of slices, and/or other aspects of or relating to the resources.

These and other aspects and embodiments of the disclosed subject matter will now be described with respect to the drawings.

Referring now to the drawings, FIG. 1 illustrates a block diagram of an example system 100 that can desirably manage resources associated with a responder communication network and/or a communication network, in accordance with various aspects and embodiments of the disclosed subject matter. The system 100 can include a communication network 102 that can comprise a mobility core network (e.g., a wireless communication network) and/or a packet data network (e.g., an IP-based network, such as the Internet and/or intranet) that can be associated with the mobility core network.

The mobility core network of the communication network 102 can operate to enable wireless communication between communication devices and/or between a communication device and the communication network 102. The communication network 102 can include various components, such as network (NW) nodes, e.g., radio network nodes) that can be part of the communication network 102 to facilitate communication of information between devices (e.g., communication devices) that can be associated with (e.g., communicatively connected to) the communication network 102. In some embodiments, the communication network 102 can employ MIMO technology to facilitate data communications between devices (e.g., network devices, communication devices, or other types of devices) associated with the communication network 102.

As used herein, the terms "network node," "network node component," and "network component" can be interchangeable with (or include) a network, a network controller, or any number of other network components. Further, as utilized herein, the non-limiting term radio network node, or network node can be used herein to refer to any type of network node serving communications devices and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes also can include multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Network nodes can be, for example, Node B devices, base station (BS) devices, access point (AP) devices, transmission points (TRPs), and radio access network (RAN) devices. Other examples of network nodes can include multi-standard radio (MSR) nodes, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like. In accordance with various embodiments, a network node can be, can include, or can be associated with (e.g., communicatively connected to) a network device of the communication network 102.

In some embodiments, the communication network 102 can comprise network equipment (NW EQUIP.) 104 and edge network equipment and/or resources (EDGE NW EQUIP. AND RESOURCES) 106. The network equipment 104 can be or can comprise a network node, such as described herein. The edge network equipment and/or resources 106 can be or can comprise a network node and/or resources (e.g., network resources, computing resources, storage resources, and/or other resources) that can be located at an edge of the communication network 102 that can be located (e.g., physically located and/or logically located) in relatively close proximity a geographic area 108 associated with an event 110 (e.g., as compared to the locations of other network nodes or resources of the communication network 102). The communication network 102 can employ desirable cloud and edge computing and storage technologies (e.g., 5G or other next generation technologies).

At given times, one or more communication devices, such as, for example, communication device (CD) 112, communication device 114, or communication device 116, can connect or attempt to connect to the communication network 102 to communicate with the communication network 102 and/or communicate with other communication devices associated with the communication network 102. The communication device 112 can be associated with one or more users, such as user 118, the communication device 114 can be associated with one or more users, such as user 120, and one or more communication devices 116 can be associated with one or more data sources 122 (e.g., one or more external data sources, which can be external to the communication network 102). A communication device (e.g., communication device(s) 112, 114, or 116, or other communication device described herein) also can be referred to as, for example, a device, a mobile device, or a mobile communication device. The term communication device can be interchangeable with (or include) a UE or other terminology. A communication device (or UE, device, mobile device, or wireless device) can refer to any type of wireless device that can communicate with a radio network node in a cellular or mobile communication system. Examples of communication devices can include, but are not limited to, a device to device (D2D) UE, a machine type UE or a UE capable of machine to machine (M2M) communication, a Personal Digital Assistant (PDA), a tablet or pad (e.g., an electronic tablet or pad), an electronic notebook, a mobile terminal, a cellular and/or smart phone, a computer (e.g., a laptop embedded equipment (LEE), a laptop mounted equipment (LME), or other type of computer), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, or other type of device or sensor), a broadband communication device (e.g., a wireless, mobile, and/or residential broadband communication device, transceiver, gateway, and/or router), a dongle (e.g., a Universal Serial Bus (USB) dongle), an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a music or media player, speakers (e.g., powered speakers having wireless communication functionality), an appliance (e.g., a toaster, a coffee maker, a refrigerator, an oven, or other type of appliance having wireless communication functionality), a set-top box, an IP television (IPTV), a device associated or integrated with a vehicle (e.g., automobile, airplane, bus, train, ship, or other type of vehicle), a virtual assistant (VA) device, a drone, a home or building automation device (e.g., security device, climate control device, lighting control device, or other type of home or building automation device), an industrial or manufacturing related device, a farming or livestock ranch related device, and/or any other type of communication devices (e.g., other types of Internet of Things (IoT) devices). It is to be appreciated and understood that, while the communication devices (e.g., 112, 114, or 116), as described herein with regard to various embodiments, can be wireless communication devices that can connect to the communication network 102 via a wireless communication connection, in certain embodiments, a communication device can connect to the communication network 102 via a wireline communication connection, wherein such communication device can comprise functionality to utilize all or at least some of the various communication services that can be accessed via the communication network 102 (e.g., communication services that can be accessed via a service provider (SP) network), such as described herein.

It is noted that the various aspects of the disclosed subject matter described herein can be applicable to single carrier as well as to multicarrier (MC) or carrier aggregation (CA) operation of the communication device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio access bearers) on some carriers (e.g., data plus speech can be simultaneously scheduled).

It is to be appreciated and understood that the terms element (e.g., element in connection with an antenna), elements, and antenna ports also can be used interchangeably, but can carry the same meaning, in this subject disclosure. In some embodiments, more than a single antenna element can be mapped to a single antenna port.

As disclosed, the mobility core network of the communication network 102 can include various network components or devices, which can include one or more base stations, such as, for example, base station (BS) 124. For instance, the mobility core network can include one or more radio access networks (RANs) (not explicitly shown in FIG. 1), wherein each RAN can include one or more base stations (e.g., access points (APs)), such as, for example, base station 124. Each base station (e.g., base station 124) can serve communication devices (e.g., communication device 112) located in respective coverage areas served by respective base stations in the mobility core network of the communication network 102. The respective base stations can be associated with one or more sectors (not shown), wherein respective sectors can comprise respective cells. For instance, the base station 124 can comprise or be associated with one or more cells (not explicitly shown in FIG. 1). The cells can have respective coverage areas that can form the coverage area covered by the one or more sectors. The respective communication devices (e.g., communication device 112) can be communicatively connected to the communication network 102 via respective wireless or wireline communication connections with one or more of the respective cells.

In some embodiments, a RAN can be an open-RAN (O-RAN) that can employ an open interface that can support interoperability of devices (e.g., network devices) from different entities (e.g., vendors). The O-RAN can build or establish wireless connections through virtualization. In certain embodiments, the O-RAN can utilize a common platform that can reduce reliance on proprietary platforms of service providers. The O-RAN also can employ standardized interfaces and application programming interfaces (APIs) to facilitate open source implementation of the O-RAN. In certain embodiments, the RAN can be a cloud-RAN (C-RAN) that can be located in or associated with a cloud computing environment, which can include various cloud network components of the communication network 102.

It is to be appreciated and understood that, while various aspects and embodiments of the disclosed subject matter are described herein with regard to 5G and other next generation communication networks, the techniques of the disclosed subject matter described herein can be utilized (e.g., applied to), in same or similar form, to 4G communication networks, and the disclosed subject matter includes all such aspects and embodiments relating to implementation of the techniques of the disclosed subject matter to 4G communication networks.

In some embodiments, the system 100 can comprise a responder communication network (RESPONDER COMM. NW) 126 that can be associated with (e.g., communicatively connected to) the communication network 102 (e.g., via the base station 124 or other network equipment of the communication network 102). The responder communication network 126 can be employed to provide communication services (e.g., wireless communication services), information services, first responder-related services, event-related services, and/or other desired services or associated resources to devices, personnel, and/or vehicles that can be located in a desired geographic area, such as, for example, the geographic area 108 in connection with an event, such as, for example, the event 110. For example, if the event 110 is a disaster or an emergency event, the responder communication network 126 can be a mobile communication network that can be deployed to (e.g., created in or in proximity to, and/or moved to or in proximity to) the area (e.g., geographic area 108) associated with the event 110 to provide desired services and resources to personnel (e.g., first responders or other personnel) and vehicles (e.g., first responder vehicles or other type of vehicle) responding to or otherwise associated with the event 110.

The responder communication network 126 can comprise or can be associated with (e.g., communicatively connected to) network equipment, comprising one or more portable (e.g., mobile or movable) base stations, such as, for example, portable base station (PBS) 128 and/or portable base station 130, which can provide wireless communication services, and/or other services (e.g., information services, first responder-related services, and/or event-related services) or associated resources (e.g., via the portable base station 128 and/or portable base station 130), to devices, personnel, and/or vehicles located in the coverage area of the responder communication network 126 (e.g., devices located in the coverage area in or associated with the geographic area 108) that are connected to the network equipment (e.g., portable base station 128 and/or portable base station 130). A portable base station (e.g., 128 or 130) can be moved to a desired location in or associated with the geographic area 108 to facilitate providing desired services, with desirable quality (e.g., wireless communication services having suitable, sufficient, reliable, and/or optimal communication quality), to the devices, personnel, and/or vehicles in or associated with the geographic area 108.

The system 100 also can comprise various devices that can be part of or associated with (e.g., communicatively connected to) the responder communication network 126. For instance, the responder communication network 126 can comprise or be associated with a group of sensors, such as sensor (S) 132, sensor 134, and/or sensor 136, that can be distributed in, and movable to, desired locations throughout the geographic area 108 (or other region proximately located to the geographic area 108 or otherwise associated with the event 110) and can sense (e.g., detect and/or measure) conditions (e.g., environmental or other conditions) in or associated with the geographic area 108 in connection with the event 110, as more fully described herein. Additionally or alternatively, the responder communication network 126 can comprise or be associated with one or more devices (e.g., communication and/or IOT devices), such as device 138 (e.g., a drone or robotic device), that can be mobile (e.g., movable) and can be moved to desired locations throughout the geographic area 108 (or other region proximately located to the geographic area 108 or otherwise associated with the event 110). The device 138 can capture or detect features or conditions (e.g., environmental or other conditions) of or associated with the geographic area 108 and event 110, as more fully described herein. For instance, the device 138 can capture digital images, infrared images, heat map information, or other desired information relating to features or conditions in or associated with the geographic area 108 and event 110.

Environmental conditions or other conditions can comprise or relate to, for example, a wind speed, a wind direction, an air quality level, a smoke level, a pollution level, a pollution type, a temperature level, a barometric pressure level, a water level, a wave size, an oxygen level, a carbon dioxide level, a carbon monoxide level, a gas level, a gas type, a chemical level, a chemical type, a contamination level, a parasitic level, a toxin level, an acidic level, a structural condition of a physical structure (e.g., house, building, vehicle, container, tree, a landscape, or other structure), a structural condition parameter value, and/or another type of condition, in or associated with the geographic area 108.

In some embodiments, one or more other devices, such as communication device 140 and communication device 142, associated with one or more users (e.g., first responder or other user), such as user 144, and/or one or more vehicles, such as vehicle 146, can be associated with (e.g., communicatively connected to) the responder communication network 126 via the one or more portable base stations (e.g., 128 or 130). The one or more users (e.g., user 144) can utilize the one or more communication devices (e.g., 140 or 142) to communicate with other users, via their communication devices, associated with the responder communication network 126 or the communication network 102, for example, in connection with the event 110 (e.g., to facilitate responding to and/or providing services or assistance with regard to the event 110). The vehicle 146 can be, for example, a fire truck, a law enforcement vehicle, an ambulance, an emergency medical technicians (EMT) vehicle, a military vehicle, a construction vehicle (e.g., construction equipment), an automobile, a bus, a truck, a motorcycle, or other desired type of vehicle.

In accordance with various embodiments, the system 100 can comprise a resource management component (RMC) 148 that can be part of or associated with the communication network 102, and can desirably (e.g., suitably, efficiently, reliably, and/or optimally) manage various resources of or associated with the communication network 102 and the responder communication network 126. The RMC 148 can leverage the capabilities of the communication network 102 (e.g., 5G or other next generation technologies and capabilities) to provide desirable supportive functionalities to the responder communication network 126, which can facilitate expanding the functionality and capabilities of the responder communication network 126, can improve the performance and operation of the responder communication network 126, and can enable the responder communication network 126 to be more agile and to more effectively and efficiently respond to an event 110 (e.g., an ongoing crisis, such as a disaster or emergency situation). The RMC 148 can be or can comprise an intelligent network data analytics, reconfiguration, and enhancement (e.g., optimization) engine (also referred to herein as INDOoR engine) that can process data (e.g., network-related data or other data) in real time or near real time, fuse or synthesize network data with data obtained from external data sources (e.g., data source(s) 122), and provide supportive functionalities for the responder communication network 126.

For instance, the RMC 148 can desirably (e.g., suitably, efficiently, reliably, and/or optimally) establish a reliable network of devices (e.g., sensors 132, 134, and/or 136; one or more devices, such as device 138; or other communication or IoT devices) in an area of interest (e.g., in or associated with the geographic area 108, in connection with the event 110), and can determine desirable locations for deploying one or more portable base stations (e.g., portable cells), such as portable base stations 128 and/or 130, in the area of interest, in accordance with defined resource management criteria, as more fully described herein. In accordance with various embodiments, the RMC 148 can create and utilize AI and ML models for predictive analytics, such as, for example, predictive analytics to predict an environmental condition (e.g., predict wind direction or speed) in connection with an event 110 (which can be desirable for firefighters, for example), troubleshooting (e.g., automatic or dynamic troubleshooting) of the responder communication network 126, and/or providing of desirable alternative routes with better connectivity (e.g., wireless communication connectivity) for communication devices of users (e.g., first responders or other type of user (e.g., user 144)).

In some embodiments, the RMC 148 can instantiate a virtualized dedicated network, which can have guaranteed service level agreement (SLA) performance, for the smart routing of data traffic, can provide network and computing resources (e.g., edge network equipment and/or resources 106) at an edge of the communication network 102 (e.g., an edge in proximity to the geographic area 108, event 110, responder communication network 126, and/or a communication device), with desirably low latency for users (e.g., users of the responder communication network 126), and configure desirably high quality communication links between communication devices (e.g., communication devices 140 and/or 142) of the users (e.g., user 144) and other communication devices (e.g., communication devices 112 and/or 114) of other entities (e.g., hospital, emergency room, fire department, law enforcement department, government agency, military command post, or other type of entity) in different applications. The disclosed subject matter, by employing the RMC 148 and its techniques, can enhance the responder communication network 126, including improving the QoS of the responder communication network 126 and reducing the operations and maintenance costs of the responder communication network 126, while also generating more revenue for the service provider associated with (e.g., owning, managing, and/or operating) the communication network 102 and/or responder communication network 126.

In the disclosed framework of the system 100, the RMC 148 can receive (e.g., obtain, collect, and/or aggregate), in real time or near real time, respective network-related data (e.g., communication condition-related data or other data) from the responder communication network 126 and the communication network 102, including one or more internal data sources 150 (e.g., internal databases or other type of internal data source), wherein the network-related data associated with the responder communication network 126 can be obtained from, for example, one or more portable base stations (e.g., 128 and/or 130) and/or other network equipment, and wherein the network-related data associated with the communication network 102 can be obtained from, for example, from one or more base stations (e.g., 124), network equipment 104, edge network equipment and/or resources 106, internal data source(s) 150, and/or other network equipment. The network-related data can comprise respective network performance indicators (e.g., key performance indicators (KPIs)), quality indicators (e.g., key quality indicators (KQIs)), and respective communication-related measurements associated with the responder communication network 126 and the communication network 102, wherein such network performance indicators, quality indicators, and communication-related measurements can comprise or relate to, for example, signal-to-interference-plus-noise ratio (SINR), reference signal received power (RSRP), reference signal received quality (RSRQ), channel quality indicator (CQI), data throughput, bit rate, latency, packet loss, bandwidth, connection- or session-related parameters, handover-related parameters, QoS, QoE, and/or other desired wireless communications measurements, metrics, or parameters. The network-related data associated with the responder communication network 126 also can comprise sensor data received from the group of sensors (e.g., sensors 132, 134, and/or 136), data received from one or more devices (e.g., device 138 (e.g., drone, robotic device, or other IoT device)), and/or data received from one or more communication devices (e.g., communication devices 140 and/or 142) associated with the responder communication network 126. The network-related data also can comprise other information (e.g., internal data, such as data stored by the internal data source(s) 150) relating to the communication network 102, responder communication network 126, services, applications, devices (e.g., communication devices, IoTs, or other types of devices), sensors, network equipment, slices, or other desired information.

The RMC 148 also can receive (e.g., in real time or near real time, or over time as otherwise desired) auxiliary data (e.g., external data) from one or more data sources (e.g., one or more external data sources), such as data source 122 (e.g., via communication device(s) 116). The auxiliary data can comprise, for example, weather information (e.g., which can be received from a weather information source), geographic or map information (e.g., which can be received from a geographic or map information source), traffic information (e.g., which can be received from a traffic information source), UTM information (e.g., which can be received from a UTM information source), or another desired type of auxiliary data that can be received from another desired data source. For example, in connection with the event 110, the RMC 148 can receive weather information (e.g., temperature, humidity, wind direction, wind speed, precipitation forecast or measurements, barometric pressure, heat index, or other type of weather metric) associated with the geographic area 108 from the weather source, geographical or map information (e.g., roads, paths, trails, homes, buildings, elevation, topography, landscape, hills, mountains, or other geographical characteristics) associated with the geographic area 108 from the geographical or map source, traffic information (e.g., road traffic information) associated with the geographic area 108 from the traffic information source, and/or UTM information associated with the geographic area 108 from the UTM information source.

The RMC 148, employing the INDOoR engine, can collaboratively process and fuse the network-related data and the auxiliary data to provide additional functionalities to enhance the operation and expand the functionalities of the responder communication network 126 and make it more effective and efficient in responding to an event (e.g., event 110), provide desirably reliable and high quality connectivity for communication devices (e.g., communication devices 140 and/or 142) of users (e.g., first responders or other users) in different applications, and reduce operations and maintenance costs associated with the responder communication network 126, such as more fully described herein. The RMC 148 can process, fuse, and utilize the network-related data and the auxiliary data to determine desirable (e.g., suitable, efficient, reliable, and/or optimal) management (e.g., automatic and/or dynamic management) of resources associated with the responder communication network 126 and/or the communication network 102, including, as some examples, device and/or sensor placement, traffic routing, portable base station deployment, path planning, virtualized network dedication creation and management, and/or monitoring and intelligent troubleshooting of the responder communication network 126, such as more fully described herein.

The disclosed subject matter can implement the framework (e.g., RMC 148 and associated services) in different ways, such as, for example, as a request or subscription model. In this framework, the disclosed subject matter, employing the RMC 148 and associated components, can desirably (e.g., easily or efficiently) add desired additional services to the INDOoR engine to support users (e.g., first responders or other users) in a particular area of interest (e.g., geographic area 108). The RMC 148 also can enable a user to terminate a service at a desired (e.g., appropriate) time. This can make the disclosed framework more agile, scalable, and cost effective.

Figure 2:
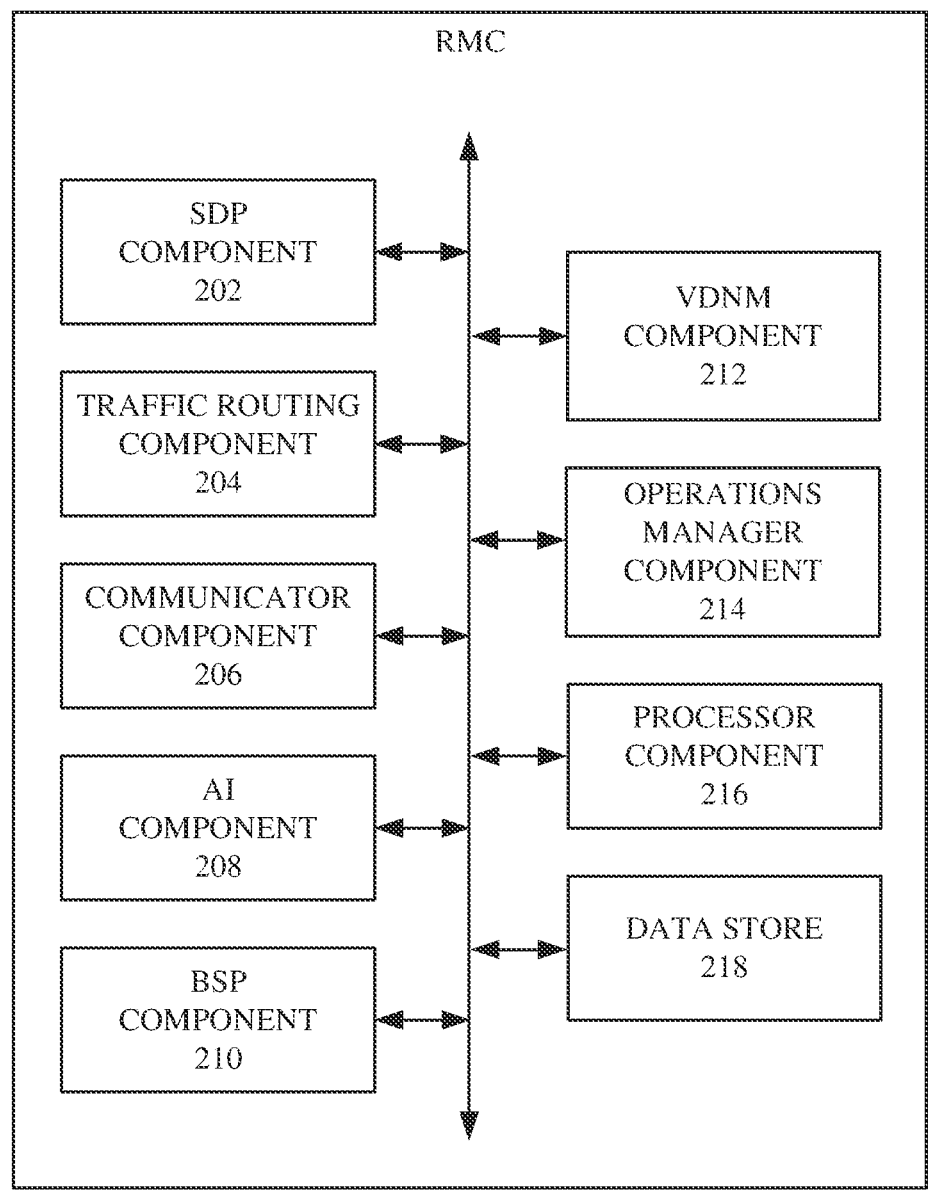
FIG. 2 depicts a block diagram of an example resource management component that can desirably manage resources associated with the responder communication network and/or the communication network, in accordance with various aspects and embodiments of the disclosed subject matter.

Referring to FIG. 2 (along with FIG. 1), FIG. 2 depicts a block diagram of an example RMC 148 that can desirably manage resources associated with the responder communication network 126 and/or the communication network 102, in accordance with various aspects and embodiments of the disclosed subject matter.

In some embodiments, the RMC 148 can determine desirable sensor and/or device placement and traffic routing. The RMC 148 can comprise a sensor and device placement (SDP) component 202 that can be utilized to determine desirable placement of sensors (e.g., 132, 134, and/or 136) and/or devices (e.g., 138), and a traffic routing component 204 that can be utilized to determine desirable routing of traffic (e.g., routing of vehicles (e.g., 146) in or associated with the geographic area 108 in connection with the event 110). In many events (e.g., event 110), such as disasters and emergency situations, users (e.g., first responders or other personnel) can desire (e.g., want or need) to distribute sensors (e.g., sensors 132, 134, and/or 136), sometimes many sensors, in or associated with (e.g., in proximity to or otherwise related or relevant to) a geographic area 108 to sense and/or measure environmental conditions or other conditions (e.g., environmental or other parameters), such as described herein, and reliably transfer the sensor data relating to the environmental or other conditions via the responder communication network 126 to the RMC 148 of or associated with the communication network 102 for further processing and collaborative fusion with the auxiliary information to enable the RMC 148 to render more desirable decisions or determinations, and to predict changes in the environmental conditions or other conditions associated with the geographic area 108.

For instance, in connection with the event 110, the RMC 148 can analyze the network-related data and/or auxiliary data the RMC 148 already has (e.g., analyze current network-related data relating to the geographic area 108, historical network-related data relating to the geographic area 108 or another geographic area(s), and/or the auxiliary data). Based at least in part on the results of analyzing the network-related data and/or auxiliary data the RMC 148 already has, the SDP component 202 can determine desirable (e.g., suitable, best, or optimal) respective locations to distribute respective sensors of the group of sensors (e.g., sensors 132, 134, and/or 136) in or associated with the geographic area 108 so that desirable (e.g., suitable, most informative, and/or optimal) sensor data (e.g., environmental measurements relating to the environmental conditions) can be sensed and collected by the group of sensors and a desirable sensor network (e.g., suitable, reliable, and/or optimal wireless sensor network) can be established with desirable connectivity to the underlying communication infrastructure (e.g., the responder communication network 126 and the communication network 102). The RMC 148, employing a communicator component 206, can communicate instructions or recommendations regarding respective placement (e.g., location) of the respective sensors of the group of sensors (e.g., sensors 132, 134, and/or 136) in or associated with the geographic area 108 to one or more communication devices (e.g., communication devices 140 and/or 142) associated with one or more users (e.g., user 144) and/or to one or more devices (e.g., device 138) to have the one or more users and/or the one or more devices move or place the sensors of the group of sensors to the desirable respective locations determined by the SDP component 202.

Also, based at least in part on the analysis results, the RMC 148 (e.g., employing the INDOoR engine and INDOoR analytic functions) can desirably navigate one or more devices (e.g., drones, robotic devices, and/or other type of device), such as device 138, into the area of interest (e.g., in or associated with the geographic area 108) to have the one or more devices obtain (e.g., capture, detect, or collect) desired information relating to the event 110 (e.g., information relating to environmental or other conditions relating to the event 110) and/or for data traffic routing. For instance, based at least in part on the analysis results, the SDP component 202 can determine a desirable location in or associated with the geographic area 108 to move or place the one or more devices (e.g., device 138), in connection with the event. The RMC 148, employing the communicator component 206, can communicate instructions or recommendations regarding respective navigation and placement (e.g., location) of the one or more devices (e.g., device 138), as determined by the SDP component 202, to the one or more devices (e.g., device 138) or to a communication device(s) (e.g., 112, 114, 140, and/or 142) associated with a user(s) (e.g., 118, 120, and/or 144) for consideration, use, and/or implementation by the user(s).

As an example of sensor and device placement, based at least in part of the results of the analysis of the network-related data and/or auxiliary data, and given the event type (e.g., wildfire; chemical or hazmat spill; hurricane disaster; or other event type) of the event 110, current conditions in or associated with the geographic area 108, and historical use of sensors or devices in the geographic area 108 or other similar geographic area under similar circumstances as the event 110, the SDP component 202 can determine that a first sensor (e.g., a first sensor of a first sensor type) is to be placed in a first location in or associated with the geographic area 108, a second sensor (e.g., a second sensor of a first or second sensor type) is to be placed in a second location in or associated with the geographic area 108, and one or more other respective sensors of one or more respective sensor types are to be placed in respective locations in or associated with the geographic area 108, and can determine that one or more respective devices (e.g., drone, robotic device, or other device) are to be moved to (e.g., navigated to) or positioned in one or more respective locations in or associated with the geographic area 108, in accordance with the defined resource management criteria.

For example, in the case of a wildfire, based at least in part of the analysis results, and given the event type, the current conditions, and the historical use of sensors or devices in the geographic area 108 or other similar geographic area under similar circumstances as the event 110, the SDP component 202 can determine that there are a number of locations in the geographic area 108, including first, second, and third locations, where a sensor that can sense temperature can be placed. From the analysis, the SDP component 202 also can determine that the first location and the second location, but not the third location, satisfy a first defined resource management criterion relating to temperature sensing for wildfire events, with the second location being determined to be the highest ranked (e.g., best) location for placing the sensor, in accordance with the first defined resource management criterion. From the analysis, the SDP component 202 further can determine that the first location and the third location, but not the second location, satisfy a second defined resource management criterion relating to wireless communication quality. Based at least in part on such analysis results and determinations, the SDP component 202 can determine that the sensor is to be placed in the first location, rather than the second or third locations, since the first location satisfies the applicable (e.g., first and second) resource management criteria, even though the second location was determined to be a higher ranked location for placing the sensor to sense temperatures associated with the wildfire.

The group of sensors (e.g., sensors 132, 134, and/or 136) can desirably communicate the sensor data to the RMC 148 via one or more portable base stations (e.g., 128 and/or 130) associated with the responder communication network 126 and via network equipment (e.g., base station 124, network equipment 104, and/or edge network equipment and/or resources 106) associated with the communication network 102.

With regard to traffic routing, based at least in part on the analysis results (e.g., analysis results relating to environmental and/or other conditions relating to the event 110, weather and/or environmental information relating to the event 110, map information relating to the geographic area 108, and/or other desired information associated with the event 110), the traffic routing component 204 can determine desirable (e.g., suitable, best, or optimal) routing of traffic, including one or more vehicles (e.g., vehicle 146) (and/or associated personnel), in or associated with the geographic area 108, in connection with the event 110. The RMC 148, employing the communicator component 206, can communicate instructions or recommendations regarding respective routing of traffic, including the one or more vehicles (e.g., vehicle 146) (and/or associated personnel), as determined by the traffic routing component 204, to a communication device(s) (e.g., 112, 114, 140, and/or 142) associated with a user(s) (e.g., 118, 120, and/or 144) for consideration, use, and/or implementation by the user(s).

In some embodiments, in connection with the event 110, the RMC 148 (e.g., the traffic routing component 204 of the RMC 148), employing the INDOoR engine, also can determine and provide desirable travel routes (e.g., suitable or optimal alternative travel routes, such as physical routes on roads) for personnel (e.g., first responders or other personnel) to utilize, wherein such desirable travel routes can provide communication devices (e.g., 140 and/or 142) associated with the personnel (e.g., user 144 and/or user associated with vehicle 146) desirable connectivity (e.g., wireless connectivity with desirably high QoS) to the responder communication network 126 and/or communication network 102 and/or access to resources at the network edge (e.g., access to the edge network equipment and/or resources 106). For example, based at least in part on the results of the data analysis and/or AI or ML data analysis of the network-related data and/or the auxiliary data, the traffic routing component 204 can determine a desirable (e.g., suitable, enhanced, and/or optimal) travel route for the vehicle 146 to travel in or associated with the geographic area 108 and other area of interest as the vehicle 146 travels to a desired destination (e.g., a hospital) to enable the communication device(s) (e.g., 142) associated with personnel and/or the vehicle 146 to have desirable connectivity (e.g., high speed, continuous, and reliable wireless connectivity with desirably high QoS) with the responder communication network 126 (e.g., a portable base station(s) of the responder communication network 126) and/or the communication network 102 (e.g., a base station of the communication network 102), and/or to have access to resources at the network edge (e.g., access to the edge network equipment and/or resources 106), in accordance with the defined resource management criteria. This can be desirable, for example, in telemedicine and with regard to smart ambulances where it can be desirable (e.g., wanted or needed) for the communication devices (e.g., 140 and/or 142) of such ambulances to have a reliable and continuous high-speed and/or high QoS communication connection to communication devices (e.g., 112 and/or 114) of clinics and physicians (e.g., emergency room specialists) to enable the EMTs to obtain desired medical treatment information from the clinics or physicians, via the communication connection, to enable the EMTs to start and perform triage or medical treatments on patients quickly, reliably, and securely.

In certain embodiments, the network-related data can be fused (e.g., combined, synthesized, or aggregated) with the auxiliary data (e.g., from one or more internal data sources 150 and/or external data sources 122) and used to predict changes in environmental parameters or other parameters over a desired period(s) of time (e.g., a relatively short time period or a relatively long time period). For example, it can be desirable for fire fighters to predict the direction and speed of the wind when combating a fire, such as a wildfire or large building fire. Sensor data relating to environmental conditions obtained from the group of sensors (e.g., 132, 134, and/or 136) can be useful to predict changes in environmental or other parameters. Auxiliary data, such as, for example weather information and/or geographic map information for the area of interest, obtained from data sources (e.g., data source(s) 122 via communication device(s) 116) also can be useful and can play a significant role in accurate and precise prediction of the direction and speed of the wind, and/or prediction of other environmental parameters, over long or short periods of time.

For instance, the RMC 148 comprise or be associated with an AI component 208 that can perform an AI or ML analysis on the network-related data, including the sensor data, and the auxiliary data, using desired AI or ML techniques, functions, and algorithms (e.g., AI, ML, and/or sensory fusion algorithms), and can make various predictions relating to the event 110 based at least in part on the results of the AI or ML analysis, such as described herein. For example, with regard to the example fire event, based at least in part on the results of the AI or ML analysis, the AI component 208 can predict, to a defined degree (e.g., a threshold degree or level) of likelihood or probability, a change (if any) that will occur for one or more environmental conditions (e.g., wind direction, wind speed, temperature, humidity, precipitation, or other environmental condition) in or associated with the geographic area 108 over a first (e.g., shorter) defined time period and/or a change (if any) that will occur for the one or more environmental conditions in or associated with the geographic area 108 over a second (e.g., longer) defined time period, in accordance with the defined resource management criteria. The RMC 148 and/or AI component 208 can analyze such predicted changes in the one or more environmental conditions, and based at least in part on the results of the analysis of the predicted changes and/or other analysis of network-related data and/or auxiliary data, the RMC 148 can determine a responsive action that can be performed to facilitate managing the event 110 (e.g., the fire) and/or mitigating (e.g., reducing or minimizing) harm or damage to people (e.g., residents, first responders, or other people), animals, and the geographic area 108.

The responsive action can relate to the management and utilization of resources (e.g., sensors, devices, portable base stations, personnel, vehicles, computing resources, or other resources). For instance, based at least in part on the results of the analysis of the predicted changes and/or the other analysis of the network-related data and/or the auxiliary data, the RMC 148 can determine respective locations where respective sensors (e.g., 132, 134, and/or 136) and/or devices (e.g., 138) are to be positioned or moved to, and/or a change(s) to a location(s) of a sensor(s) and/or a device(s). Additionally or alternatively, based at least in part on such analysis results, the RMC 148 can determine respective traffic routes (e.g., roads, paths, or other routes) for one or more respective vehicles (e.g., vehicle 146) and/or personnel (e.g., user 144) to travel in or associated with the geographic area 108, and/or a change(s) to a traffic route(s) for a vehicle(s) and/or personnel. The RMC 148, employing the communicator component 206, can communicate instructions or recommendations regarding the responsive action (e.g., resource implementation, sensor or device placement or navigation, changes to sensor or device locations, traffic routes or changes to traffic routes, or other responsive action) to a communication device(s) (e.g., 112, 114, 140, and/or 142) associated with a user(s) (e.g., 118, 120, and/or 144) or vehicle(s) (e.g., 146) for consideration, use, and/or implementation by the user(s).

In some embodiments, users (e.g., 118, 120, and/or 144) who have appropriate authorization, and who are appropriately authenticated, can use their communication devices (e.g., 112, 114, and/or 140) and/or interfaces to access the network-related data (e.g., sensor or device information, such as measurement information or captured information), intelligence information (e.g., AI or ML analysis information, or other information relating thereto), or other information relating to the resources or management of resources.

In accordance with various embodiments, the RMC 148 can desirably manage deployment of portable base stations (e.g., 128 and/or 130) in or associated with the geographic area 108 in connection with the event 110, in accordance with the defined resource management criteria. In many disasters and emergency situations, it can be desirable for first responders to deploy portable base stations (e.g., portable cell towers) in an area of interest associated with the event (e.g., area of interest where the disaster or emergency situation is occurring or an area in proximity thereto) to provide better coverage and connectivity (e.g., wireless coverage and connectivity) between different personnel and/or agencies and the underlying networks (e.g., responder communication network 126 and the communication network 102). The RMC 148 (e.g., employing the INDOoR engine) can comprise a base station placement (BSP) component 210 that can utilize network-related data (e.g., network-related performance indicators and/or other network-related data), auxiliary data (e.g., map information, topography information, data relating to sensors, devices, and/or personnel, and/or other auxiliary data) to desirably determine where to move and position one or more portable base stations (e.g., 128 and/or 130) in or associated with the geographic area 108 in connection with the event 110 in a way that desirable coverage (e.g., reliable wireless communication coverage with sufficiently high QoS) can be provided to sensors and/or devices associated with the responder communication network 126, in accordance with the defined resource management criteria. In some embodiments, the RMC 148 can employ the AI component 208 in conjunction with the BSP component 210, wherein the AI component 208 can perform an AI or ML analysis the network-related data and/or the auxiliary data, using desired AI or ML techniques, functions, and algorithms (e.g., AI, ML, and/or sensory fusion algorithms), and can make various predictions relating to the event 110, including where to move or position one or more portable base stations (e.g., 128 and/or 130), based at least in part on the results of the AI or ML analysis, such as described herein. As part of the AI or ML analysis, the AI component 208 can perform problem modeling and enhancement (e.g., optimization) relating to the event 110 and resources (e.g., portable base stations, sensors, devices, or other resources) using desired AI or ML techniques, comprising, for example, linear and/or non-linear, integer and/or mixed-integer, ML based, graph based, and/or heuristic enhancement techniques and associated algorithms.

The BSP component 210 and/or AI component 208 can determine or infer desirable (e.g., suitable, enhanced, and/or optimal) respective placement (e.g., positioning, locations, or movement) of respective portable base stations (e.g., 128 and/or 130) in or associated with the geographic area 108 in connection with the event 110 based at least in part on the results of the data analysis and/or AI or ML data analysis of the network-related data and/or the auxiliary data. When determining the respective placement of the respective portable base stations (e.g., 128 and/or 130) in or associated with the geographic area 108 in connection with the event 110, the BSP component 210 and/or AI component 208, as part of the data analysis and/or the AI or ML data analysis, can take into account various factors, such as, for example, capabilities, functions, and/or specifications of a portable base station, topography and traffic routes (e.g., available traffic routes, paths, or other travelways that can be used by vehicles or personnel) in or associated with the geographic area 108, event type of the event 110, status of the event 110, communication device type(s) of a communication device(s) (e.g., 140 and/or 142) of personnel (e.g., capabilities, functions, and/or specifications of a communication device of a first responder), desired or expected locations of personnel and their communication devices in or associated with the geographic area 108, sensor type of a sensor (e.g., capabilities, functions, and/or specifications of a sensor), desired locations of the sensors (e.g., 132, 134, and/or 136) in or associated with the geographic area 108, device type of a device (e.g., capabilities, functions, and/or specifications of a device), desired locations of the devices (e.g., 138) in or associated with the geographic area 108, power availability (e.g., availability of a power source to power a portable base station, although a portable base station can have its own power source or can be associated with a vehicle that can provide power to the portable base station), and/or other desired factors.

For example, in connection with the event 110, based at least in part on the results of the data analysis and/or AI or ML data analysis of the network-related data and/or the auxiliary data, the BSP component 210 and/or AI component 208 can determine or infer that respective sensors (e.g., 132, 134, and/or 136) can be located in respective locations in or associated with the geographic area 108 to provide desirable sensor data relating to the event 110, respective devices (e.g., 138) can be located in certain other respective locations in or associated with the geographic area 108 to provide desirable information (e.g., captured or detected information) relating to the event 110, respective personnel (e.g., user 144 and/or user of vehicle 146) and their communication devices (e.g., 140 and/or 142) can be located in still other respective locations in or associated with the geographic area 108, and there are two available travel routes on which a portable base station 128 can be moved. Further, based at least in part on the results of such data analysis and/or AI or ML data analysis, the BSP component 210 and/or AI component 208 can determine or infer that the portable base station 128 can provide desirable (e.g., suitable, enhanced, efficient, reliable, and/or optimal) connectivity to the communication devices of personnel in the area, the sensors, and the devices if the portable base station 128 is moved to a first location along the first travel route, whereas it also is determined or inferred that the portable base station 128 will not provide as good of connectivity to the communication devices, sensors, or devices if the portable base station 128 is moved to a second location along the first travel route or to a location (e.g., third or other location) along the second travel route. Accordingly, the BSP component 210 can determine that the portable base station is to be moved to the first location along the first travel route. The RMC 148, employing the communicator component 206, can communicate instructions or a recommendation, which can indicate, instruct, or recommend that the portable base station 128 is to be moved to and set up at the first location along the first travel route, to a communication device(s) (e.g., 112, 114, 140, and/or 142) associated with a user(s) (e.g., 118, 120, and/or 144) for consideration, use, and/or implementation by the user(s).

The RMC 148 also determine whether one or more portable base stations (e.g., 128 and/or 130) in or associated with the geographic area 108 in connection with the event 110 is or are to have operational parameters or locations modified due to a change in circumstances and/or due to underperformance of the one or more portable base stations. The RMC 148, employing the INDOoR engine, can monitor the operations of the responder communication network 126, including the portable base stations (e.g., 128, 130), and can collect network-related data (e.g., real time or near real time network measurements and KPIs), and can apply intelligent network monitoring and troubleshooting techniques and algorithms to detect network anomalies, if any, of the responder communication network 126 or the communication network 102 and determine the root cause(s) of any network anomaly(ies). For instance, the RMC 148 and/or the AI component 208 can implement performance monitoring tools and AI or ML models to identify any cells (e.g., cell(s) of a portable base station(s) 128 and/or 130) that are experiencing undesirable (e.g., significant or severe) interferences and can execute operations, which can include launching procedures or generating work tickets, to initiate and/or perform a responsive action to resolve any issues (e.g., any interference issues), in accordance with the defined resource management criteria. For example, based at least in part on the results of a data analysis and/or AI or ML analysis of the network-related data and/or auxiliary data, the RMC 148 can determine that a portable base station 128 located in a particular location in the geographic area 108 is underperforming (e.g., due to interference in the signals and/or another performance issue). Based at least in part on the results of a data analysis and/or AI or ML analysis of the network-related data and/or auxiliary data, the RMC 148 can determine a desirable (e.g., suitable, enhanced, and/or optimal) modification that can be made to the portable base station 128 to improve (e.g., enhance, maximize, and/or optimize) performance of the portable base station 128 and the responder communication network 126, in accordance with the defined resource management criteria, wherein the modification can comprise, for example, moving the portable base station 128 to a different location and/or modifying (e.g., adjusting or reconfiguring) one or more base station parameters, such as an operational parameter relating to base station operation, a signal-related parameter relating to transmitted or received communication signals, an antenna-related parameter relating to one or more antennas, and/or another type of base station parameter of or associated with the portable base station 128. Some non-limiting examples of base station parameters can comprise a transmission power parameter relating to transmission power, a tilt parameter relating to a tilt of the antenna, a direction parameter relating to a direction of the antenna, a height parameter relating to height of an antenna, a beamforming parameter relating to beamforming, or a MIMO parameter relating to MIMO communication of or associated with the portable base station 128. The RMC 148 can initiate a responsive action, which can comprise communicating instructions or a recommendation, launching a base station modification procedure, and/or generating a work ticket, to facilitate instructing or recommending that the portable base station 128 be moved to the different location and/or that the one or more base station parameters be modified based at least in part on the determined modification. The portable base station 128 can be modified accordingly.

In some embodiments, users can subscribe to the disclosed network monitoring, management, and troubleshooting services, and can use a desired combination of such services to enhance (e.g., improve, maximize, and/or optimize) the performance of the responder communication network 126 in supporting operations in an area of interest (e.g., geographic area 108 or other area of interest).

Figure 3:
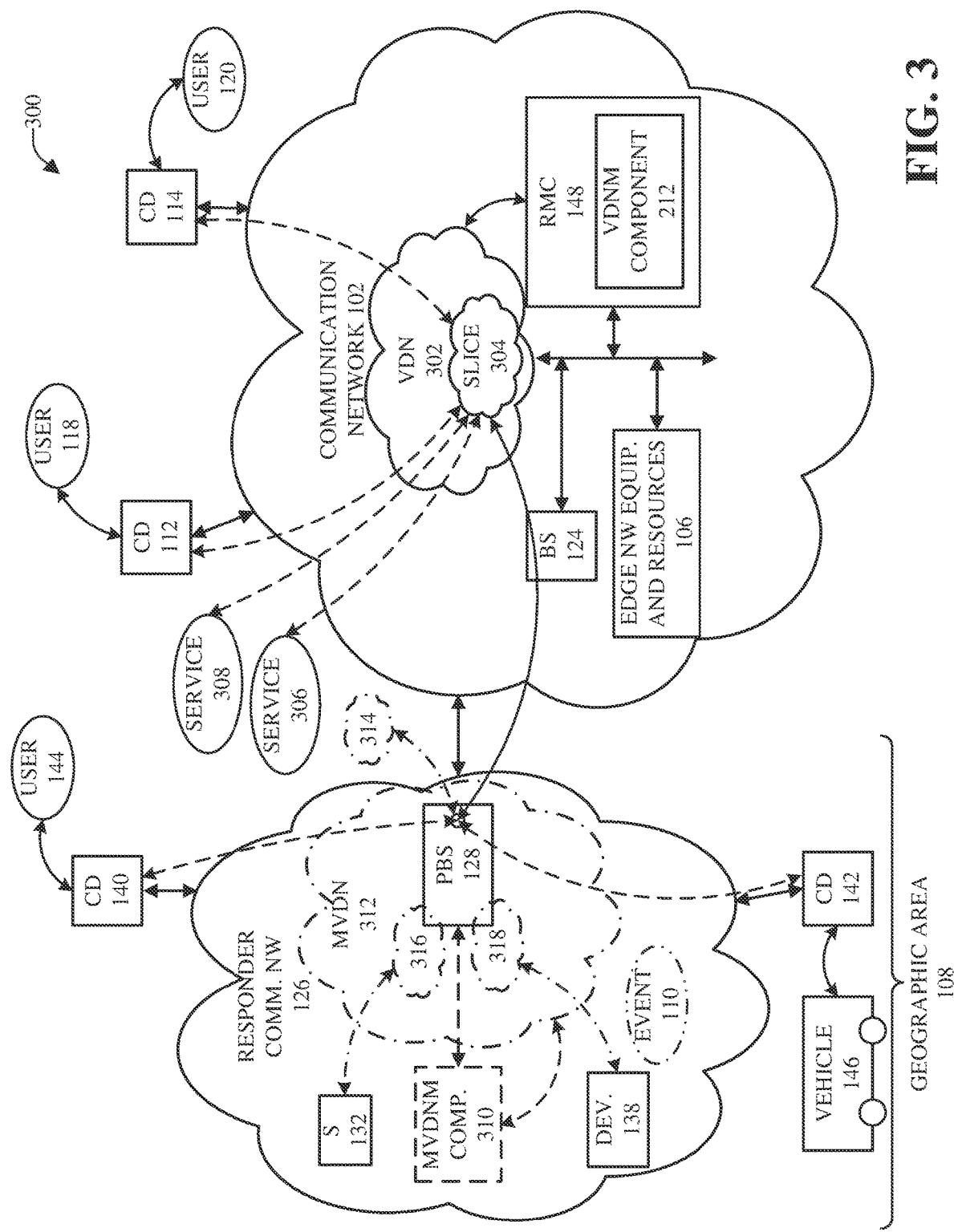
FIG. 3 illustrates a block diagram of an example system that can desirably manage resources, including a virtualized network and slices, associated with the responder communication network and/or the communication network, in accordance with various aspects and embodiments of the disclosed subject matter.

Referring to FIG. 3 (along with FIGS. 1 and 2), FIG. 3 illustrates a block diagram of an example system 300 that can desirably manage resources, including a virtualized network and slices (e.g., network or service slices), associated with the responder communication network and/or the communication network, in accordance with various aspects and embodiments of the disclosed subject matter. The system 300 can comprise the communication network 102, the responder communication network 126, and the various components, devices, and equipment described herein, for example, with regard to the system 100 and depicted in FIG. 1. For reasons of brevity and clarity though, only the communication network 102, the responder communication network 126, and certain components, devices, and equipment are explicitly depicted in the system 300 of FIG. 3.

In some instances, it can be desirable for the responder communication network 126 to have additional resources (e.g., additional and/or dedicated resources) to enable personnel (e.g., first responders or other personnel) to desirably (e.g., suitably, effectively, efficiently, quickly, reliably, and/or optimally) respond to an event 110 (e.g., a disaster or emergency situation). In certain embodiments, the RMC 148 (e.g., employing the INDOoR engine) can create and manage (e.g., automatically or dynamically create and manage) one or more vertical or horizontal slices (e.g., vertical or horizontal network, core, or service slices) of or associated with the communication network 102 that can provide desired additional resources to the responder communication network 126 and associated devices, equipment, and personnel, and can guarantee the desired SLA for supporting the personnel and the applications (e.g., applications utilized by the personnel as part of the response to the event 110). In some embodiments, the RMC 148 can comprise a virtualized dedicated network management (VDNM) component 212 that can create (e.g., generate), instantiate, manage (e.g., control), secure, and/or release slices, in accordance with the defined resource management criteria. For instance, the VDNM component 212 can create, instantiate, manage, secure, and/or release slices in a way such that a guaranteed SLA can be offered and provided to a user (e.g., user 144, user 118, user 120, or other user, such as a user associated with the vehicle 146). The communication network 102 can comprise a virtualized dedicated network (VDN) 302 that can be utilized by the VDNM component 212 to create and manage slices.

A slice (e.g., slice 304) can comprise, be associated with, or utilize virtual resources and/or physical resources (e.g., hardware resources) of or associated with the communication network 102. For instance, the VDNM component 212 can instantiate or create desired virtual resources (e.g., virtual processing or computing resources, virtual machines (VMs), and/or other virtual resources) based at least in part on (e.g., using) resources (e.g., physical or hardware resources) of the communication network 102.

As an example of creation and use of a slice 304 during an event 110, if a remote clinical treatment or surgery is to be performed by a user (e.g., user 144 or user associated with vehicle 146) associated with the responder communication network 126, the VDNM component 212 can create and manage the slice 304 to support the performance of such remote clinical treatment or surgery by the user. For instance, the VDNM component 212 can create and manage the slice 304, which can have sufficient additional and/or dedicated resources of or associated with the communication network 102, including the VDN 302, to enable the communication device (e.g., 140 or 142) of the user (e.g., user 144 or user associated with vehicle 146) to have desirable connectivity (e.g., wireless communication connectivity), with sufficiently high communication link quality (e.g., sufficiently high QoS) that can satisfy (e.g., meet or exceed) defined communication link quality criteria (e.g., a defined threshold communication link quality value(s) relating to a communication link quality parameter(s)), of or in accordance with the defined resource management criteria. In certain embodiments, the additional and/or dedicated resources associated with a slice (e.g., slice 304) can comprise edge resources (e.g., the edge network equipment and/or resources 106) of the communication network 102 to facilitate providing a desirably high quality communication link and to reduce or minimize latency. The slice 304 and associated high quality communication link can enable the communication device (e.g., 140 or 142) of the user (e.g., user 144 or user associated with vehicle 146) to desirably (e.g., suitably, efficiently, reliably, and/or optimally) receive desired information (e.g., information relating to the remote clinical treatment or surgery) from the communication network 102 and/or a communication device(s) (e.g., 112 and/or 114) associated with a user(s) (e.g., 118 and/or 120) and/or a service(s) (e.g., 306 and/or 308) that can be associated with the communication network 102, and to enable the communication device (e.g., 140 or 142) of the user (e.g., user 144 or user associated with vehicle 146) to desirably communicate desired information (e.g., information relating to the remote clinical treatment or surgery) to the communication device(s) (e.g., 112 and/or 114) associated with the user(s) (e.g., 118 and/or 120) and/or the service(s) (e.g., 306 and/or 308).

The VDNM component 212 also can monitor and adjust (e.g., intelligently, automatically, and/or dynamically monitor and adjust) slices, such as slice the 304, to desirably maintain (e.g., guarantee) the desired communication link quality (e.g., desired SLA) of the communication link of the slice 304. For instance, in response to identifying a change, or predicting a change will occur, in quality (e.g., degradation of quality) of the communication link of the slice 304, the VDNM component 212 can determine a modification that can be to the slice 304 or associated resources to improve or maintain the desirably high quality of the slice 304 and associated communication link, wherein the modification can comprise adjustment of a parameter(s) of a resource and/or adding more or different resources to the slice 304. The VDNM component 212 can release (e.g., terminate or discontinue) the slice 304 and associated resources when the procedure is finished (e.g., terminated).

It is to be appreciated and understood that, while a slice can be utilized to support a remote clinical treatment or surgery, the disclosed subject matter is not so limited, and the VDNM component 212 can create and manage a variety of types of slices for a variety types of purposes, and, if and as desired, slices can be associated with and can facilitate providing a variety of types of services, comprising services of the communication network 102 and/or services (e.g., external services) associated with the communication network 102 (e.g., as such external services are provided by a an external service provider or service network).

In some embodiments, the RMC 148 can employ the AI component 208 (e.g., employ the AI or ML models and/or AI or ML techniques and algorithms) to create (e.g., automatically and/or dynamically create) a slice (e.g., slice 304) based at least in part on an analysis (e.g., AI or ML analysis)

of network-related data or other data (e.g., external data) indicating that a slice can be desirable or useful to a communication device and associated user. In other embodiments, the RMC 148 can create a slice (e.g., slice 304) in response to a request for a slice or associated service or resources received from a user (e.g., via a communication device or interface).

In certain embodiments, the responder communication network 126 can comprise a mobile VDNM (MVDNM) component 310 (MVDNM COMP. 310) that can create and manage a mobile (e.g., local and movable) VDN (MVDN) 312 of the responder communication network 126 to facilitate creating and managing slices (e.g., slices with desired additional or dedicated resources) of the responder communication network 126 and/or facilitate provision and management of slices created and managed by the VDNM component 212 of the communication network 102. In some embodiments, the MVDNM component 310 can be movable and can be associated with or integrated with a portable base station, such as portable base station 128. For instance, the MVDNM component 310 and portable base station 128 can be transported using a vehicle or other desired mode of transportation to a desired location (e.g., a desired location in or associated with the geographic area 108 in connection with the event 110). The MVDNM component 310 can be comprise the same or similar functions and features as the VDNM component 212, and can coordinate with the VDNM component 212 to facilitate creating and managing slices, and communicating information via the communication links (e.g., high quality and/or secure communication links) associated with the slices between communication devices associated with the responder communication network 126 or communication network 102.

The MVDNM component 310 can, for example, coordinate with the VDNM component 212 to maintain and provide the slice 304 to the communication device (e.g., 140 or 142) of the user (e.g., user 144 or user associated with vehicle 146) associated with the responder communication network 126 and, using the slice 304 and associated communication link and resources, communicate information between the communication device (e.g., 140 or 142) and another communication device(s) (e.g., 112 and/or 114) associated with the user(s) (e.g., 118 and/or 120) and/or the service(s) (e.g., 306 and/or 308) associated with the communication network 102. As some other examples, the MVDNM component 310 can create and manage slices (e.g., local network, core, or service slices), with associated communication links (e.g., high quality and/or secure communication links), resources (e.g., additional resources), and/or services, between devices associated with the responder communication network 126, such as slice 314 between communication device 140 and communication device 142, slice 316 between communication device 140 and sensor 132, and/or slice 318 between communication device 140 and device (DEV.) 138, in accordance with the defined resource management criteria.

In some embodiments, the MVDNM component 310 can create, manage, and provide slices (e.g., slice(s) 314, 316, and/or 318), and/or the MVDNM component 310 or portable base station(s) (e.g., 128 and/or 130) can manage and maintain communication links, between devices (e.g., communication device 140, communication device 142, sensors (e.g., 132, 134, and/or 136), and/or other devices, such as device(s) 138) associated with the responder communication network 126, even if there is a disruption of communications between the responder communication network 126 and the communication network 102. During such a disruption, the MVDNM component 310 or portable base station(s) (e.g., 128 and/or 130) can collect information associated with the slice(s) (e.g., slice(s) 314, 316, and/or 318) or other communications between devices associated with the responder communication network 126. Once communication between the responder communication network 126 and the communication network 102 has been re-established, the MVDNM component 310 or portable base station(s) (e.g., 128 and/or 130) can communicate the information associated with the slice(s) or the other communications, or a desired portion thereof, to the communication network 102 to synchronize the responder communication network 126 with the communication network 102 and/or synchronize the MVDNM component 310 with the VDNM component 212.

With further regard to FIG. 2 (along with FIG. 1), the RMC 148 also can comprise an operations manager component 214, a processor component 216, and a data store 218. The operations manager component 214 can control (e.g., manage) operations associated with the RMC 148. For example, the operations manager component 214 can facilitate generating instructions to have components of the RMC 148 perform operations, and can communicate respective instructions to respective components (e.g., SDP component 202, traffic routing component 204, communicator component 206, AI component 208, BSP component 210, VDNM component 212, processor component 216, and/or data store 218) of the RMC 148 to facilitate performance of operations by the respective components of the RMC 148 based at least in part on the instructions, in accordance with the defined resource management criteria and resource management algorithms (e.g., resource management algorithms, AI or ML algorithms, or other type of algorithm, as disclosed, defined, recited, or indicated herein by the methods, systems, and techniques described herein). The operations manager component 214 also can facilitate controlling data flow between the respective components of the RMC 148 and controlling data flow between the RMC 148 and another component(s) or device(s) (e.g., communication devices, network equipment of the communication network, applications, data sources, services, or other component or device) associated with (e.g., connected to) the RMC 148.

The processor component 216 can work in conjunction with the other components (e.g., SDP component 202, traffic routing component 204, communicator component 206, AI component 208, BSP component 210, VDNM component 212, operations manager component 214, and/or data store 218) to facilitate performing the various functions of the RMC 148. The processor component 216 can employ one or more processors, microprocessors, or controllers that can process data, such as information relating to devices (e.g., communication devices, IoT devices, sensors, or other types of devices), users, subscriber-related information, events, network-related data, historical information, communication network, responder communication network, base stations (e.g., portable or fixed base stations), virtual dedicated networks, slices, geographical areas, maps, traffic routes, environmental conditions, location data (e.g., data regarding locations of devices), power information, applications, services, threshold values (e.g., defined communication link quality values, or other type of threshold value), metadata, parameters, traffic flows, policies, defined resource management criteria, resource management algorithms (e.g., resource management algorithms, AI or ML algorithms, or other type of algorithm), protocols, interfaces, tools, and/or other information, to facilitate operation of the RMC 148, as more fully disclosed herein, and control data flow between the RMC 148 and other components (e.g., devices, communication devices, applications or application-related devices, a base station or other network component or device of the communication network or responder communication network, data sources, services, or other component or device) associated with the RMC 148.

The data store 218 can store data structures (e.g., user data, metadata), code structure(s) (e.g., modules, objects, hashes, classes, procedures) or instructions, information relating to devices (e.g., communication devices, IoT devices, sensors, or other types of devices), users, subscriber-related information, events, network-related data, historical information, communication network, responder communication network, base stations (e.g., portable or fixed base stations), virtual dedicated networks, slices, geographical areas, maps, traffic routes, environmental conditions, location data (e.g., data regarding locations of devices), power information, applications, services, threshold values (e.g., defined communication link quality values, or other type of threshold value), metadata, parameters, traffic flows, policies, defined resource management criteria, resource management algorithms (e.g., resource management algorithms, AI or ML algorithms, or other type of algorithm), protocols, interfaces, tools, and/or other information, to facilitate controlling operations associated with the RMC 148. In an aspect, the processor component 216 can be functionally coupled (e.g., through a memory bus) to the data store 218 in order to store and retrieve information desired to operate and/or confer functionality, at least in part, to the SDP component 202, traffic routing component 204, communicator component 206, AI component 208, BSP component 210, VDNM component 212, operations manager component 214, and/or data store 218, or other component, and/or substantially any other operational aspects of the RMC 148.

With further regard to the AI component 208, in connection with or as part of an AI or ML analysis of the network-related data, the auxiliary data, and/or other data, the AI component 208 can build (e.g., construct or create), import, and/or employ AI techniques and algorithms, ML techniques and algorithms, AI and/or ML models, neural networks (e.g., trained neural networks), and/or graph mining to make predictions, inferences, calculations, prognostications, estimates, derivations, forecasts, detections, and/or computations that can facilitate managing resources (e.g., one or more portable base stations, sensors, communication devices, network slices, computing resources, power resources, personnel, or other resources) associated with the responder communication network and/or the communication network, in connection with the event; determining respective locations to move or place respective portable base stations; determining respective locations to place respective sensors, respective locations to navigate or position devices; determining a change in a condition (e.g., environmental condition or other condition) in or associated with a geographic area and/or event; determining an effect that the change in the condition can have on the responder communication network, devices or personnel associated therewith, and/or the response to the event; determining a modification to a base station parameter or location of a portable base station; determining an effect the modification to the base station parameter or location of the portable base station can have on the responder communication network, devices or personnel associated therewith, and/or the response to the event; determining whether to implement such modification to the base station parameter or location of the portable base station; determining a modification to a parameter or a location of sensor or device; determining an effect that the modification to the parameter or the location of the sensor or device can have on the responder communication network, devices or personnel associated therewith, and/or the response to the event; determining whether to implement such modification to the parameter or location of the sensor or device; determining traffic routing of vehicles, equipment, devices, and/or personnel; determining alternative routes, or changes to routes, for vehicles, equipment, devices, and/or personnel; determining whether to create a slice; determining resources to utilize with the slice; troubleshooting problems with network equipment, communication links, slices, and/or other aspects associated with responding to an event; making other desired determinations, such as the determinations described herein; and/or automating one or more functions or features of the disclosed subject matter, as more fully described herein. An AI or ML model can model or relate to the communication network 102, the responder communication network 126, devices (e.g., communication devices, IoT devices, sensors, or other devices), base stations (e.g., portable or fixed base stations) or other network equipment, slices, events, geographic areas, traffic routes, vehicles, and/or other desired functions or features.

In some embodiments, in connection with or as part of the AI or ML analysis of the network-related data, the auxiliary data, and/or other data associated with one or more events (e.g., event 110), the AI component 208 can determine, identify, or infer patterns, similarities, and/or differences in characteristics (e.g., attributes), contexts, and/or parameters (e.g., network-related parameters associated with the communication network 102 and/or responder communication network 126; device-related parameters relating to communication devices, sensors, IoTs, or other devices; vehicle parameters relating to vehicles; and/or other type of parameter) relating to conditions (e.g., environmental conditions or other types of conditions), topography, geographic area, resources, personnel (e.g., type or role of a user, skill level of personnel, or other type of characteristic), event type, affected persons (e.g., persons affected by a disaster or other type of event), and/or other aspects or features associated with one or more events. The AI component 208 can analyze and/or utilize the patterns, similarities, and/or differences in characteristics, contexts, and/or parameters across events to facilitate rendering determinations, predictions, or inferences relating to the management and use of resources and/or performance of responsive actions in connection with a particular event.

For instance, as part of the AI or ML analysis, the AI component 208 can determine, identify, or infer respective patterns relating to respective characteristics, contexts, and/or parameters across respective events, and can determine, for example, that a first group (e.g., first pattern) of characteristics, contexts, and/or parameters associated with a first event (e.g., a previous event) are similar (e.g., sufficiently similar to satisfy defined threshold similarity or matching criteria or values) to a current group (e.g., current pattern) of characteristics, contexts, and/or parameters associated with a current event with regard to which the RMC 148, responder communication network 126, communication network 102, and associated resources are being employed. The AI component 208 also can determine, identify, or infer that the management of resources by the RMC 148 and the response of the RMC 148 and associated resources with regard to the first event was substantially good and/or produced a desirable (e.g., good, suitable, acceptable, or optimal) result or outcome sufficient to satisfy the defined resource management criteria. The AI component 208 can determine, predict, or infer that, given the similarities between the first group and the current group, the management of resources and the responsive actions employed during or in connection with the first event can be utilized, or at least can be an initial or baseline point, for the management of resources and responsive actions that can be, or potentially can be, employed during or in connection with the current event. For example, the AI component 208 can determine, predict, or infer that, at least as an initial or baseline point, sensors can be deployed or distributed in a same or similar manner in or associated with a current geographic area, a portable base station can be moved to a certain location in or associated with the current geographic area, and/or other resources can be utilized in particular ways during or in connection with the current event that is same as or similar to how such resources (e.g., sensors, portable base station, or other resources) were utilized during or in connection with the first event. In some embodiments, the AI component 208 also can determine, identify, or infer certain differences between the first group and the current group, and, based at least in part on such certain differences, the AI component 208 can determine or infer that, with regard to the current event, it can be desirable (e.g., suitable, advisable, or optimal) to make certain modifications to certain use of resources, certain parameters associated with certain resources, and/or certain responsive actions to employ or perform during or in connection with the current event, as compared to the use of resources, parameters associated with resources, and/or responsive actions employed or performed during or in connection with the first event to enable a desirable (e.g., good, suitable, acceptable, enhanced, or optimal) result or outcome to be achieved with regard to the current event, in accordance with (e.g., in satisfaction of) the defined resource management criteria. The RMC 148 can manage the resources and performance of responsive actions in connection with the current event based at least in part on such AI or ML analysis results relating to the current event provided by the AI component 208. For instance, the RMC 148 can adopt and employ, or at least can consider (e.g., evaluate), such AI or ML analysis results (e.g., analysis results regarding use of resources, parameters, and/or responsive actions) relating to the current event, to manage the resources and performance of responsive actions during or in connection with the current event.

In certain embodiments, as part of the AI or ML analysis, the AI component 208 can determine the patterns, similarities, and/or differences in characteristics, contexts, and/or parameters across multiple historical events in relation to each other, and in relation to current characteristics, contexts, and/or parameters associated with a current event to facilitate determining, predicting, or inferring desirable management of resources and responsive actions that can be employed or performed by the RMC 148 and associated resources during or in connection with the current event to produce a desirable result or outcome with regard to the current event, in accordance with (e.g., in satisfaction of) the defined resource management criteria. The RMC 148 can manage the resources and performance of responsive actions during or in connection with the current event based at least in part on such AI or ML analysis results relating to the current event (e.g., in relation to multiple historical events) provided by the AI component 208.

The AI component 208 can employ various AI-based and/or ML-based schemes for carrying out various embodiments/examples disclosed herein. In order to provide for or aid in the numerous determinations (e.g., determine, ascertain, infer, calculate, predict, prognose, estimate, derive, forecast, detect, and/or compute) described herein with regard to the disclosed subject matter, the AI component 208 can examine the entirety or a subset of data (e.g., network-related data, internal data, external data, sensor data, device-related data, conditions-related data, or other data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=\text{confidence}(\text{class})$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Described herein are systems, methods, articles of manufacture, and other embodiments or implementations that can facilitate estimating locations of cells and validating cell locations (e.g., estimated cell locations and/or recorded cell locations from data sources) of cells of a communication network, as more fully described herein. The estimating locations of cells and validating cell locations of cells of a communication network, and/or other features of the disclosed subject matter, can be implemented in connection with any type of device with a connection to, or attempting to connect to, the communication network (e.g., a wireless or mobile device, a computer, a handheld device, or other type of device), any IoT device (e.g., health monitoring device, toaster, coffee maker, blinds, music players, speakers, or other type of IoT device), and/or any connected vehicles (e.g., cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE can be a target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles, or other type of UE. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS), or other type of radio network node.

Cloud Radio Access Networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller component that can control routing of traffic within the network and between the network and traffic destinations. The SDN controller component can be merged with the 5G network architecture to enable service deliveries via open Application Programming Interfaces (APIs) and move the network core towards an all Internet Protocol (IP), cloud based, and software driven telecommunications network. The SDN controller component can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier systems such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 4:
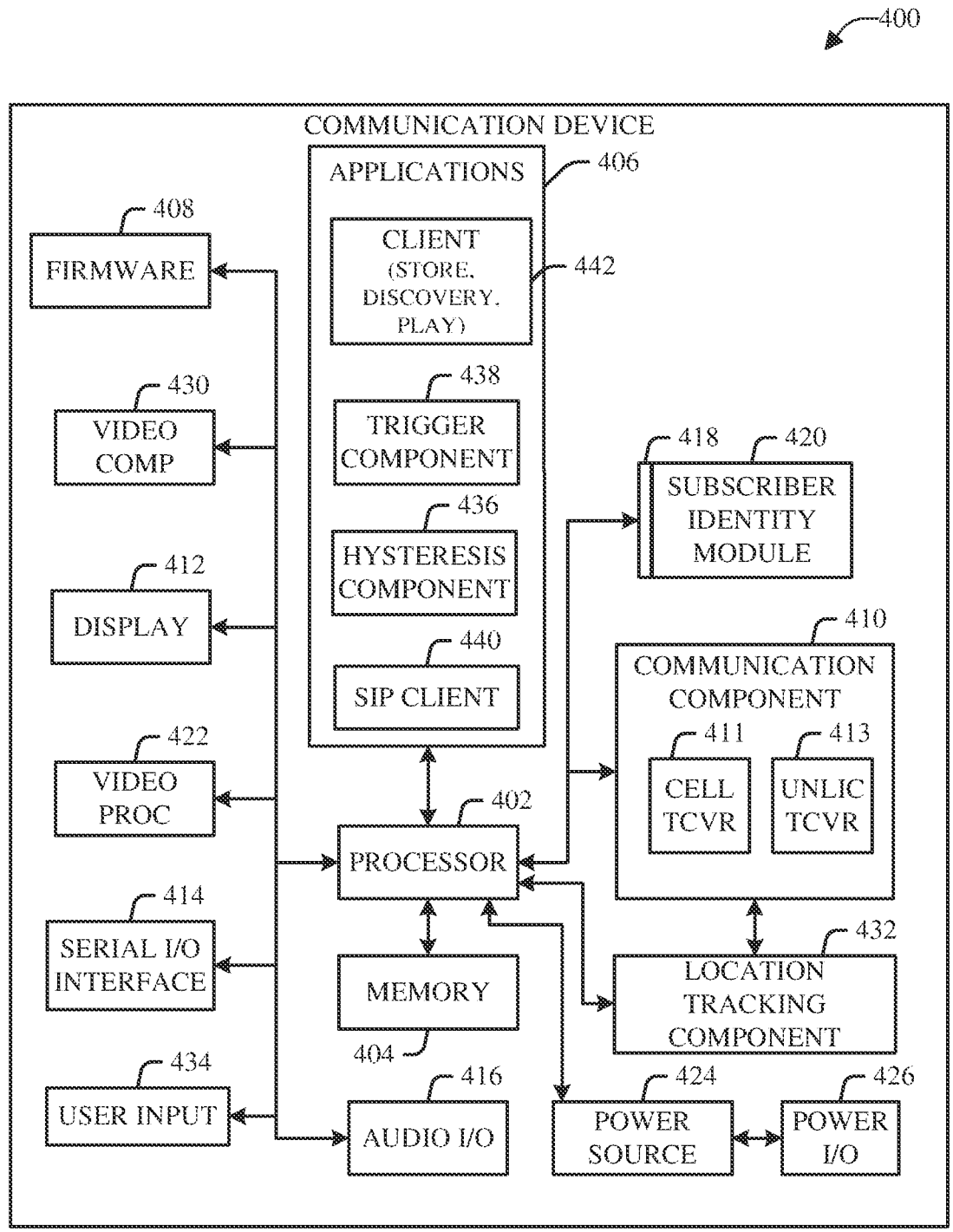
FIG. 4 depicted is a block diagram of an example communication device operable to engage in a system architecture that facilitates wireless communications according to one or more embodiments described herein.

Referring now to FIG. 4, depicted is a block diagram of an example communication device 400 (e.g., UE, wireless or mobile phone, electronic pad or tablet, electronic eyewear, electronic watch, or other electronic bodywear, or IoT device, or other type of communication device) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, or other application-related functions or features, that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The communication device 400 can include a processor 402 for controlling and processing all onboard operations and functions. A memory 404 interfaces to the processor 402 for storage of data and one or more applications 406 (e.g., a video player software, user feedback component software, or other type of application). Other applications can include voice recognition of predetermined voice commands that facilitate initiation of the user feedback signals. The applications 406 can be stored in the memory 404 and/or in firmware 408, and executed by the processor 402 from either or both the memory 404 or/and the firmware 408. The firmware 408 can also store startup code for execution in initializing the communication device 400. A communication component 410 interfaces to the processor 402 to facilitate wired/wireless communication with external systems, e.g., cellular networks, VoIP networks, and so on. Here, the communication component 410 can also include a suitable cellular transceiver (CELL TCVR) 411 (e.g., a GSM transceiver) and/or an unlicensed transceiver (UNLIC TCVR) 413 (e.g., Wi-Fi, WiMax) for corresponding signal communications. The communication device 400 can be a device such as a cellular telephone, a PDA with mobile communications capabilities, and messaging-centric devices. The communication component 410 also facilitates communications reception from terrestrial radio networks (e.g., broadcast), digital satellite radio networks, and Internet-based radio services networks.

The communication device 400 includes a display 412 for displaying text, images, video, telephony functions (e.g., a Caller ID function), setup functions, and for user input. For example, the display 412 can also be referred to as a "screen" that can accommodate the presentation of multimedia content (e.g., music metadata, messages, wallpaper, graphics, or other type of multimedia content). The display 412 can also display videos and can facilitate the generation, editing and sharing of video quotes. A serial I/O interface 414 is provided in communication with the processor 402 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 400, for example. Audio capabilities are provided with an audio I/O component 416, which can include a speaker for the output of audio signals related to, for example, indication that the user pressed the proper key or key combination to initiate the user feedback signal. The audio I/O component 416 also facilitates the input of audio signals through a microphone to record data and/or telephony voice data, and for inputting voice signals for telephone conversations.

The communication device 400 can include a slot interface 418 for accommodating a SIC (Subscriber Identity Component) in the form factor of a card Subscriber Identity Module (SIM) or universal SIM 420, and interfacing the SIM card 420 with the processor 402. However, it is to be appreciated that the SIM card 420 can be manufactured into the communication device 400, and updated by downloading data and software.

The communication device 400 can process IP data traffic through the communication component 410 to accommodate IP traffic from an IP network such as, for example, the Internet, a corporate intranet, a home network, a person area network, or other type of IP network, through an ISP or broadband cable provider. Thus, VoIP traffic can be utilized by the communication device 400 and IP-based multimedia content can be received in either an encoded or a decoded format.

A video processing component (VIDEO PROC) 422 (e.g., a camera) can be provided for decoding encoded multimedia content. The video processing component 422 can aid in facilitating the generation, editing, and sharing of video quotes. The communication device 400 also includes a power source 424 in the form of batteries and/or an AC power subsystem, which power source 424 can interface to an external power system or charging equipment (not shown) by a power I/O component 426.

The communication device 400 can also include a video component 430 for processing video content received and for recording and transmitting video content. For example, the video component 430 can facilitate the generation, editing and sharing of video quotes. A location tracking component 432 facilitates geographically locating the communication device 400. As described hereinabove, this can occur when the user initiates the feedback signal automatically or manually. A user input component 434 facilitates the user initiating the quality feedback signal. The user input component 434 can also facilitate the generation, editing and sharing of video quotes. The user input component 434 can include such conventional input device technologies such as a keypad, keyboard, mouse, stylus pen, and/or touch screen, for example.

Referring again to the applications 406, a hysteresis component 436 facilitates the analysis and processing of hysteresis data, which can be utilized to determine when to associate with the access point. A software trigger component 438 can be provided that facilitates triggering of the hysteresis component 436 when the unlicensed transceiver 413 (e.g., Wi-Fi transceiver) detects the beacon of the access point. A SIP client 440 enables the communication device 400 to support SIP protocols and register the subscriber with the SIP registrar server. The applications 406 can also include a client 442 that provides at least the capability of discovery, play and store of multimedia content, for example, music.

The communication device 400, as indicated above related to the communication component 410, can include an unlicensed transceiver 413, such as, for example, an indoor network radio and/or Wi-Fi transceiver. This function supports the indoor radio link, such as IEEE 802.11, for the dual-mode GSM device (e.g., communication device 400). The communication device 400 can accommodate at least satellite radio services through a device (e.g., handset device) that can combine wireless voice and digital radio chipsets into a single device (e.g., single handheld device).

Figure 5:
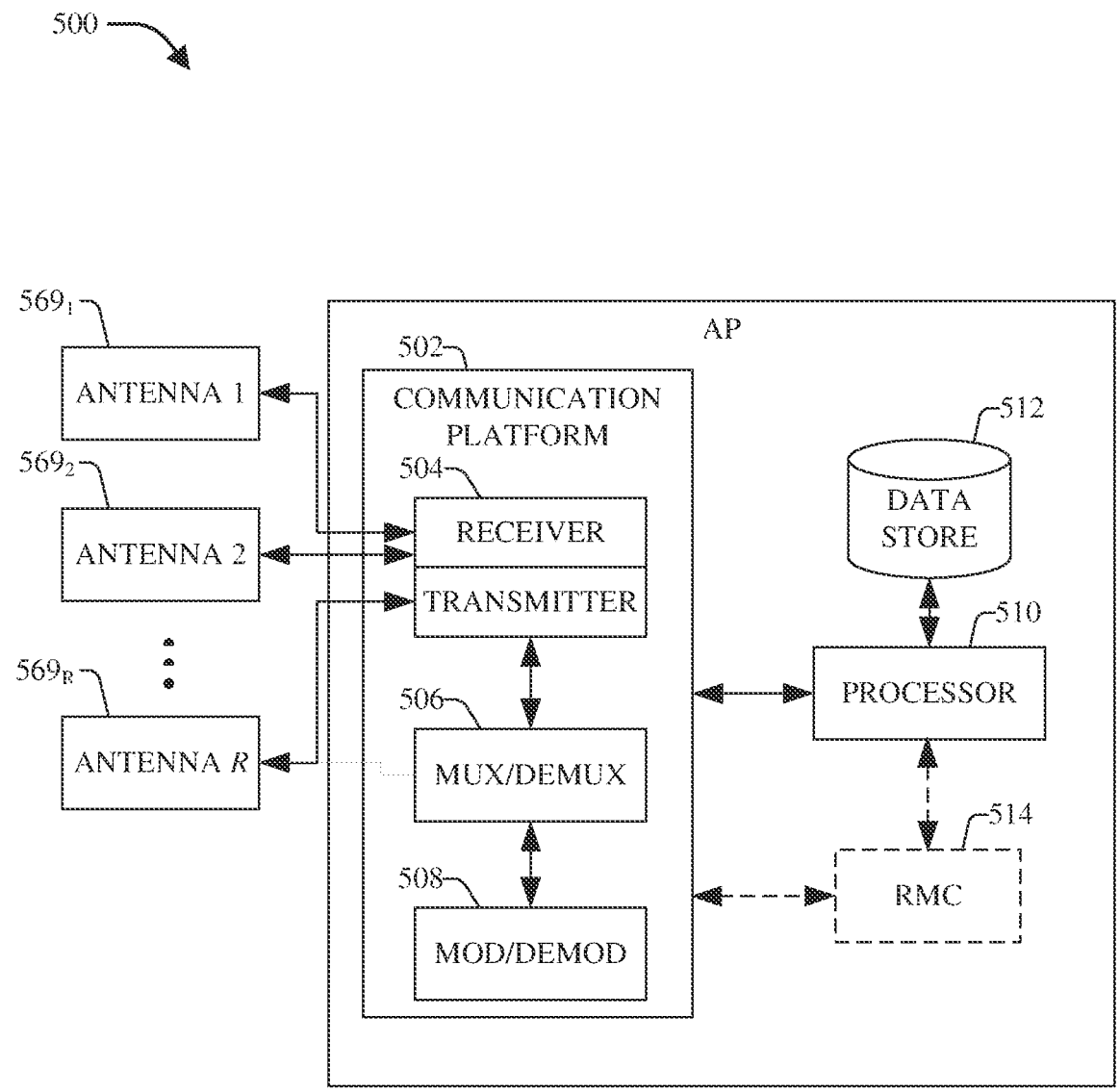
FIG. 5 illustrates a block diagram of an example access point, in accordance with various aspects and embodiments of the disclosed subject matter.

FIG. 5 illustrates a block diagram of an example access point (AP) 500 (e.g., macro base station, femto AP, pico AP, Wi-Fi AP, Wi-Fi-direct AP, or other type of AP), in accordance with various aspects and embodiments of the disclosed subject matter. The AP 500 can receive and transmit signal(s) from and to wireless devices like access points (e.g., base stations, femtocells, picocells, or other type of AP), access terminals (e.g., UEs), wireless ports and routers, and the like, through a set of antennas 5691-569R. In an aspect, the antennas 5691-569R are a part of a communication platform 502, which comprises electronic components and associated circuitry that can provide for processing and manipulation of received signal(s) and signal(s) to be transmitted. In an aspect, the communication platform 502 can include a receiver/transmitter 504 that can convert signal from analog to digital upon reception, and from digital to analog upon transmission. In addition, receiver/transmitter 504 can divide a single data stream into multiple, parallel data streams, or perform the reciprocal operation.

In an aspect, coupled to receiver/transmitter 504 can be a multiplexer/demultiplexer (mux/demux) 506 that can facilitate manipulation of signal in time and frequency space. The mux/demux 506 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), or another desired multiplexing scheme. In addition, mux/demux component 506 can scramble and spread information (e.g., codes) according to substantially any code known in the art, e.g., Hadamard-Walsh codes, Baker codes, Kasami codes, polyphase codes, and so on. A modulator/demodulator (mod/demod) 508 also can be part of the communication platform 502, and can modulate information according to multiple modulation techniques, such as frequency modulation, amplitude modulation (e.g., M-ary quadrature amplitude modulation (QAM), with M a positive integer), phase-shift keying (PSK), and the like.

The AP 500 also can comprise a processor(s) 510 that can be configured to confer and/or facilitate providing functionality, at least partially, to substantially any electronic component in or associated with the AP 500. For instance, the processor(s) 510 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, or other operations on data.

In another aspect, the AP 500 can include a data store 512 that can store data structures; code instructions; rate coding information; information relating to measurement of radio link quality or reception of information related thereto; information relating to communication conditions (e.g., signal-to-interference-plus-noise ratio (SINR), reference signal received power (RSRP), reference signal received quality (RSRQ), channel quality indicator (CQI), and/or other wireless communications metrics or parameters) associated with communication devices; information relating to communication devices, users, subscriber-related information, usage data, historical usage data, location data (e.g., data regarding locations of communication devices), queries, power information, applications, services, threshold values (e.g., defined threshold data throughput values, defined threshold screen timer values, or other type of threshold value), metadata, parameters, traffic flows, policies, rules, signaling, defined resource management criteria, resource management algorithms (e.g., resource management algorithms, AI or ML algorithms, or other type of algorithm), protocols, interfaces, tools, and/or other information; white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 510 can be coupled to the data store 512 in order to store and retrieve information (e.g., information, such as algorithms, relating to multiplexing/demultiplexing or modulation/demodulation; information relating to radio link levels; information relating to communication conditions (e.g., SINR, RSRP, RSRQ, CQI, and/or other wireless communications metrics or parameters) associated with communication devices; information relating to communication devices, users, subscriber-related information, usage data, historical usage data, location data (e.g., data regarding locations of communication devices), queries, power information, applications, services, threshold values (e.g., defined threshold data throughput values, defined threshold screen timer values, or other type of threshold value), metadata, parameters, traffic flows, policies, rules, signaling, defined resource management criteria, resource management algorithms (e.g., resource management algorithms, AI or ML algorithms, or other type of algorithm), protocols, interfaces, tools, and/or other information that can be desired to operate and/or confer functionality to the communication platform 502 and/or other operational components of AP 500.

In some embodiments, the AP 500 can comprise an RMC 514 that can be the same as or similar to, and/or can comprise the same or similar functionality as, the RMC, as elsewhere described, and as more fully described, herein. The RMC 514 can be associated with (e.g., communicatively connected to) all or at least a portion of the other components of the AP 500 to enable the RMC 514 to perform its various functions, such as more fully described herein.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 6-11. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 6:
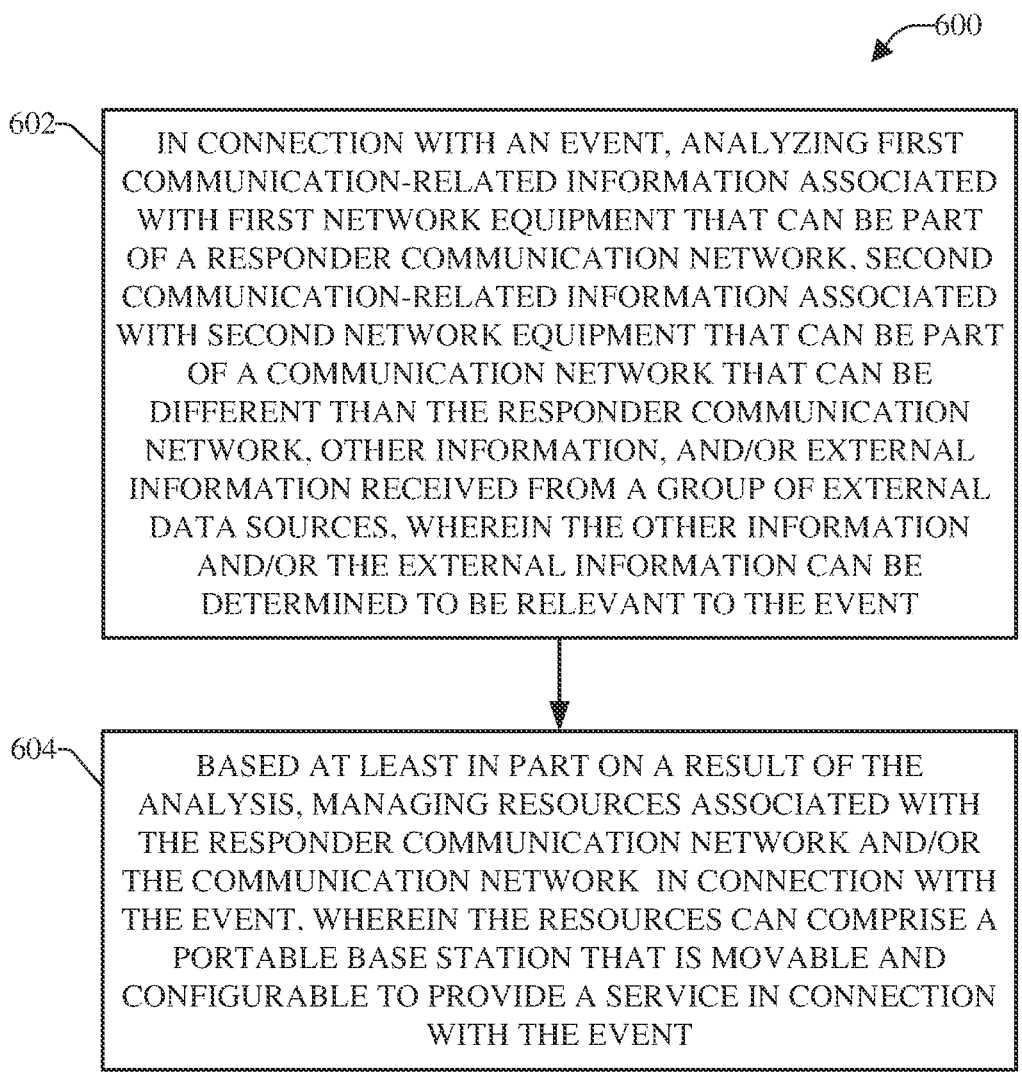
FIG. 6 illustrates a flow chart of an example method that can desirably manage resources associated with a responder communication network and/or a communication network, in accordance with various aspects and embodiments of the disclosed subject matter.

FIG. 6 illustrates a flow chart of an example method 600 that can desirably manage resources associated with a responder communication network and/or a communication network, in accordance with various aspects and embodiments of the disclosed subject matter. The method 600 can be employed by, for example, a system that can comprise the RMC, a processor component (e.g., of or associated with the RMC), and/or a data store (e.g., of or associated with the RMC).

At 602, in connection with an event, an analysis can be performed on first communication-related information associated with first network equipment that can be part of a responder communication network, second communication-related information associated with second network equipment that can be part of a communication network that can be different than the responder communication network, other information, and/or external information received from a group of external data sources, wherein the other information and/or the external information can be determined to be relevant to the event. In connection with the event, the RMC can analyze the first communication-related information associated with the first network equipment that can be part of the responder communication network, the second communication-related information associated with second network equipment that can be part of the communication network, the other information, and/or the external information. The other information can comprise, for example, environmental condition-related information or other condition-related information in or associated with a geographic area associated with the event, and can be received by the RMC from one or more sensors or devices (e.g., drones, robotic devices, or other type of device) in or associated with the geographic area. In some embodiments, the other information can comprise internal data (e.g., data stored by one or more internal data sources of the communication network) relating to the communication network, responder communication network, services, applications, devices, sensors, network equipment, slices, or other information. In certain embodiments, the other information also can comprise historical information relating to, for example, the resources, communication devices, personnel, vehicles, geographic area, or event. The RMC can receive the external information (e.g., weather information, geographical or map information, traffic information, UTM information, and/or other desired external information) from one or more external data sources (e.g., from one or more communication devices associated with the one or more external data sources).

In some embodiments, as part of the information analysis, the RMC can perform (and/or can employ the AI component to perform) an AI or ML analysis on the first communication-related information, the second communication-related information, the other information, and/or the external information to learn (e.g., self-learn), infer, predict, identify, or desirable utilization of the resources (e.g., location of resources, configuration of resources, amount of resources, or other management of use of resources) in connection with the event, as more fully described herein.

At 604, based at least in part on a result of the analysis, resources associated with the responder communication network and/or the communication network can be managed in connection with the event, wherein the resources can comprise a portable base station that is movable and configurable to provide a service in connection with the event. The RMC can desirably (e.g., suitable, efficiently, reliably, or optimally) manage the resources associated with the responder communication network and/or the communication network in connection with the event, based at least in part on the analysis results, wherein the resources can comprise at least one portable base station that can be movable and configurable to provide at least one service (e.g., wireless communication service) in connection with the event. The RMC also can manage other resources as well. For instance, based at least in part on the analysis results, the RMC can desirably manage the use, deployment, or routing of resources (e.g., portable base stations, sensors, devices (e.g., drones, robotic devices, or other type of device), location of resources, routing of personnel and vehicles, configuration of resources, use or configuration of slices (e.g., network, core, or service slices), and/or other aspects of or relating to the resources, as more fully described herein.

Figure 7:
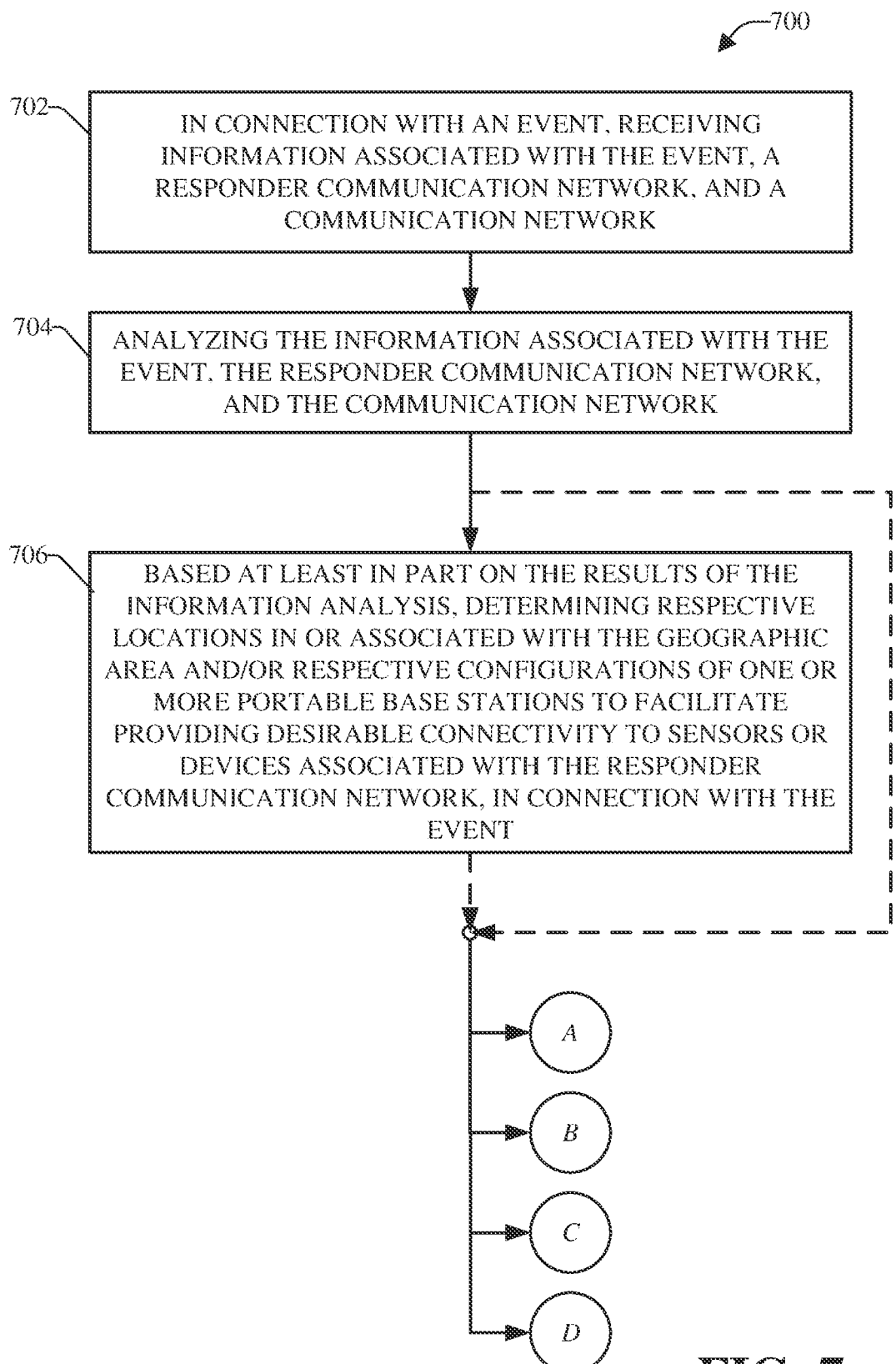
FIG. 7 depicts a flow chart of an example method that can desirably manage resources, including portable base stations, associated with a responder communication network, in accordance with various aspects and embodiments of the disclosed subject matter.

FIG. 7 depicts a flow chart of an example method 700 that can desirably manage resources, including portable base stations, associated with a responder communication network, in accordance with various aspects and embodiments of the disclosed subject matter. The method 700 can be employed by, for example, a system that can comprise the RMC, a processor component (e.g., of or associated with the RMC), and/or a data store (e.g., of or associated with the RMC).

At 702, in connection with an event, information associated with the event, a responder communication network, and a communication network can be received, wherein the information can comprise first communication-related information associated with first network equipment of the responder communication network, second communication-related information associated with second network equipment of the communication network, condition-related information relating to conditions sensed or captured by sensors or devices in or associated with a geographic area, historical information or other information that can be related to the event, other information (e.g., internal data), and/or external information associated with a group of external data sources. The RMC can receive the first communication-related information from the first network equipment of the responder communication network. In some embodiments, the first network equipment can comprise one or more portable base stations that can be deployed in one or more desired locations in or associated with the geographic area associated with the event. The RMC can receive the second communication-related information from the second network equipment of the communication network, which can be associated with the responder communication network. The RMC also can receive, via the responder communication network and/or the communication network, the condition-related information relating to conditions (e.g., environmental or other conditions) sensed or captured by the sensors or the devices (e.g., drones, robotic devices, or other devices) in or associated with the geographic area.

In some embodiments, the RMC can receive the historical information from the data store, wherein the historical information can be determined (e.g., by the RMC) to be relevant to the event. The historical information can relate to, for example, the responder communication network, the communication network, the resources (e.g., portable base stations or other network equipment, sensors, communication devices, personnel, vehicles, computing resources, or other type of resource), the geographic area, or the event. The RMC also can receive other information that can comprise internal data (e.g., data stored by the communication network) relating to the communication network, responder communication network, services, applications, devices, sensors, network equipment, slices, or other desired information that can be determined to be relevant to the event. In certain embodiments, the RMC can receive the external information (e.g., weather information, geographical or map information, traffic information, UTM information, and/or other desired external information) from one or more communication devices associated with one or more external data sources. The external information can be determined (e.g., by the RMC) to be relevant to the event.

At 704, the information associated with the event, the responder communication network, and the communication network can be analyzed. In some embodiments, the RMC can analyze the first communication-related information, the second communication-related information, the condition-related information, the historical information, and/or the external information to facilitate determining management and use of the resources associated with the responder communication network and/or the communication network. In certain embodiments, as part of the information analysis, the RMC can comprise or employ the AI component, wherein the AI component can perform an AI or ML analysis on the information associated with the event. Based at least in part on the results of the AI or ML analysis, the AI component can learn (e.g., self-learn), infer, predict, identify, or desirable utilization of the resources (e.g., location of resources, configuration of resources, amount of resources, or other management of use of resources) in connection with the event, as more fully described herein.

At 706, based at least in part on the results of the information analysis, respective locations in or associated with the geographic area and/or respective configurations of one or more portable base stations can be determined to facilitate providing desirable connectivity to sensors or devices associated with the responder communication network, in connection with the event. For instance, the RMC (and/or AI component associated therewith) can determine the respective locations in or associated with the geographic area and/or the respective configurations of the one or more portable base stations, based at least in part on the results of the information analysis, to facilitate providing desirable (e.g., suitable, reliable, or optimal) connectivity and coverage (e.g., wireless communication connectivity and coverage) to the sensors or the devices associated with (e.g., communicatively connected to) the responder communication network, in connection with the event.

In some embodiments, after performing the analyzing operation at reference numeral 704 (or after performing the operation at reference numeral 706), in addition to, or as an alternative to, performing the operation at reference numeral 706, the method 700 can proceed to reference point A, reference point B, reference point C, or reference point D, wherein the method 800 can proceed from reference point A, the method 900 can proceed from reference point B, the method 1000 can proceed from reference point C, or the method 1100 can proceed from reference point D, such as described herein.

Figure 8:
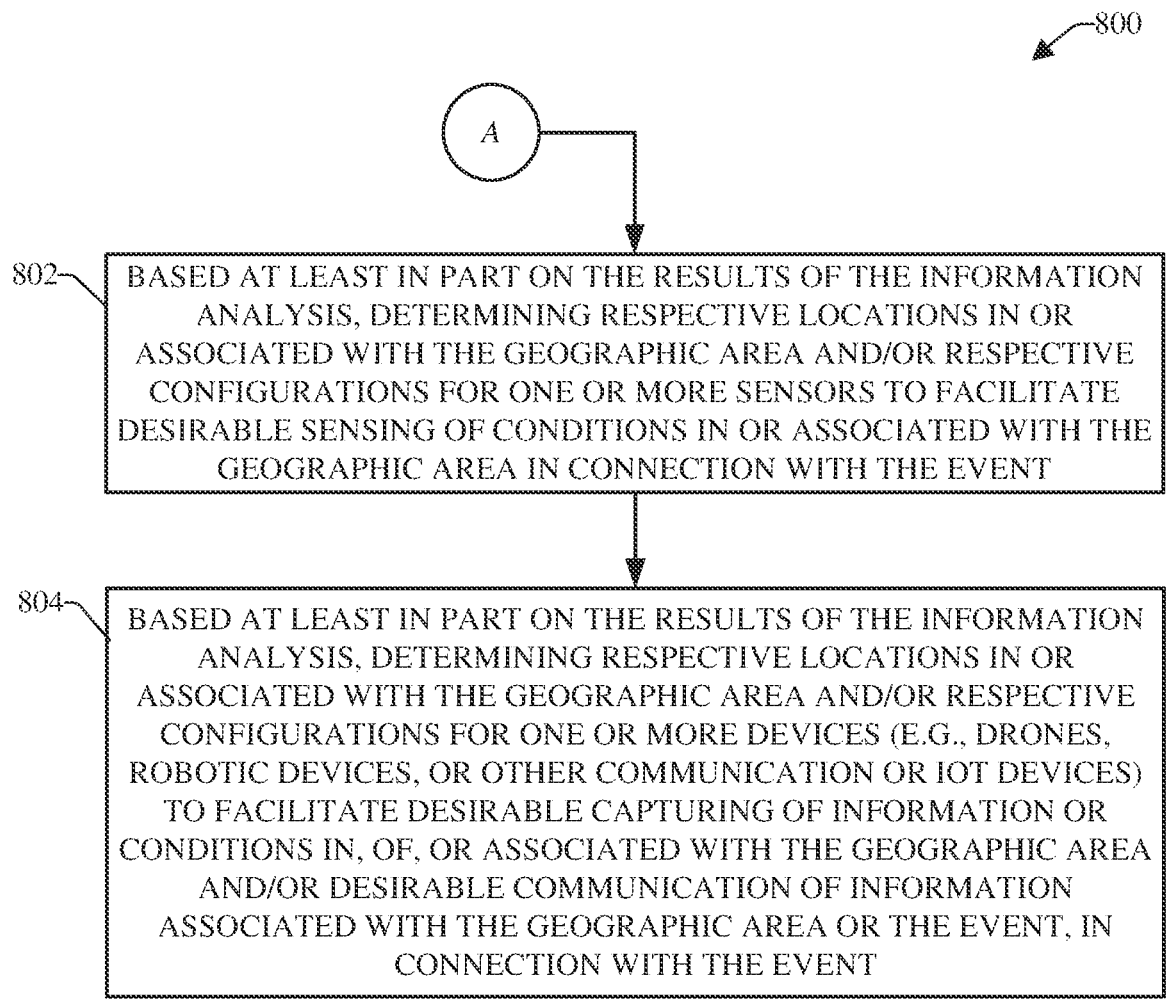
FIG. 8 illustrates a flow chart of an example method that can desirably manage resources, including sensors and devices, associated with the responder communication network, in accordance with various aspects and embodiments of the disclosed subject matter.

FIG. 8 illustrates a flow chart of an example method 800 that can desirably manage resources, including sensors and devices, associated with the responder communication network, in accordance with various aspects and embodiments of the disclosed subject matter. The method 800 can be employed by, for example, a system that can comprise the RMC, a processor component (e.g., of or associated with the RMC), and/or a data store (e.g., of or associated with the RMC). In some embodiments, the method 800 can proceed from reference point A associated with the method 700, wherein, in accordance with the method 700, an analysis can be performed on the information associated with the event, the responder communication network, and the communication network, as more fully described herein.

At 802, based at least in part on the results of the information analysis, respective locations in or associated with the geographic area and/or respective configurations for one or more sensors can be determined to facilitate desirable sensing of conditions in or associated with the geographic area in connection with the event. For example, the RMC (and/or AI component associated therewith) can determine the respective locations in or associated with the geographic area and/or the respective configurations for the one or more sensors, based at least in part on the results of the information analysis, to facilitate desirable (e.g., suitable, reliable, or optimal) sensing of conditions (e.g., environmental or other conditions) in or associated with the geographic area in connection with the event.

At 804, based at least in part on the results of the information analysis, respective locations in or associated with the geographic area and/or respective configurations for one or more devices (e.g., drones, robotic devices, or other communication or IoT devices) can be determined to facilitate desirable capturing or sensing of information (e.g., digital images, infrared images, heat map information, or other desired information) or conditions (e.g., environmental or other conditions) in, of, or associated with the geographic area and/or desirable communication of information associated with the geographic area or the event, in connection with the event. For example, the RMC (and/or AI component associated therewith) can determine the respective locations in or associated with the geographic area and/or the respective configurations for the one or more devices, based at least in part on the results of the information analysis, to facilitate desirable capturing of the conditions in or associated with the geographic area and/or desirable communication of the information associated with the geographic area or the event, in connection with the event.

Figure 9:
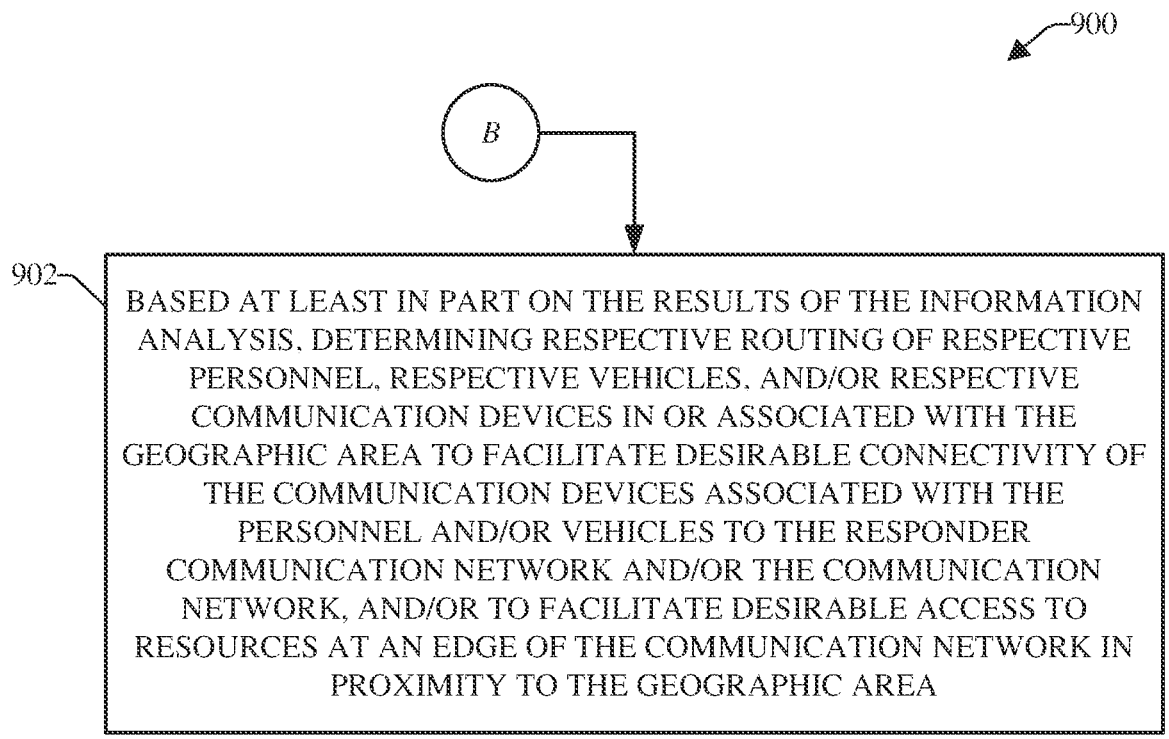
FIG. 9 presents a flow chart of an example method that can desirably manage resources, including personnel, vehicles, and communication devices, associated with the responder communication network, in accordance with various aspects and embodiments of the disclosed subject matter.

FIG. 9 presents a flow chart of an example method 900 that can desirably manage resources, including personnel, vehicles, and communication devices, associated with the responder communication network, in accordance with various aspects and embodiments of the disclosed subject matter. The method 900 can be employed by, for example, a system that can comprise the RMC, a processor component (e.g., of or associated with the RMC), and/or a data store (e.g., of or associated with the RMC). In some embodiments, the method 900 can proceed from reference point B associated with the method 700, wherein, in accordance with the method 700, an analysis can be performed on the information associated with the event, the responder communication network, and the communication network, as more fully described herein.

At 902, based at least in part on the results of the information analysis, respective routing of respective personnel, respective vehicles, and respective communication devices in or associated with the geographic area can be determined to facilitate desirable connectivity of the communication devices associated with the personnel and/or vehicles to the responder communication network and/or the communication network, and/or to facilitate desirable access to resources at an edge of the communication network in proximity to the geographic area. For instance, the RMC (and/or AI component associated therewith) can determine the respective routing of the respective personnel, the respective vehicles, and the respective communication devices in or associated with the geographic area, based at least in part on the results of the information analysis, to facilitate desirable (e.g., suitable, reliable, or optimal) connectivity (e.g., wireless connectivity that can have sufficient QoS, QoE, and/or bandwidth) of the communication devices associated with the personnel and/or vehicles to the responder communication network and/or the communication network, to facilitate desirable access to resources at the edge of the communication network in proximity to (e.g., in relatively close physical or logical proximity to) the geographic area, and/or to facilitate desirable placement of personnel, vehicles, and/or equipment to enable the personnel, vehicles, and/or equipment to perform operations or services in connection with (e.g., to respond to) the event.

Figure 10:
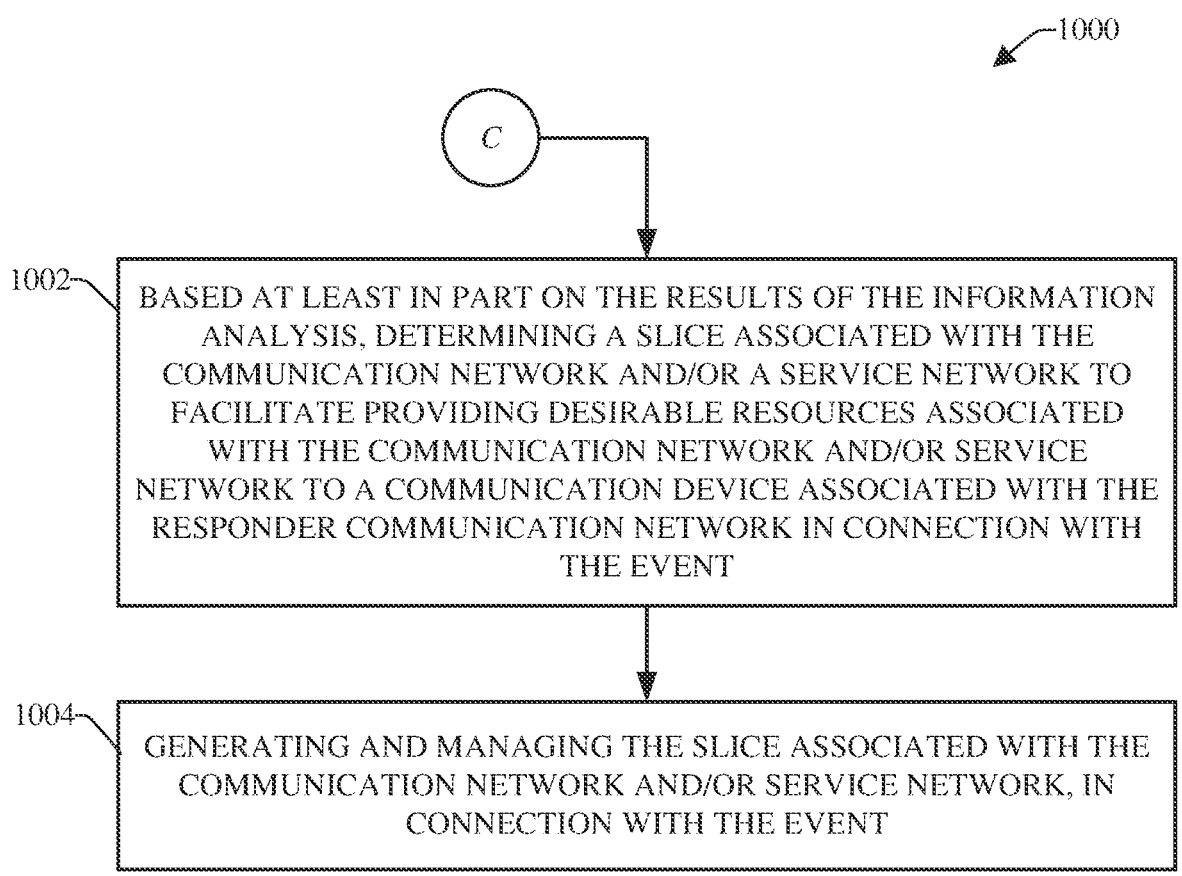
FIG. 10 depicts a flow chart of an example method that can desirably manage resources, including personnel, vehicles, and communication devices, associated with the responder communication network, in accordance with various aspects and embodiments of the disclosed subject matter.

FIG. 10 depicts a flow chart of an example method 1000 that can desirably manage resources, including personnel, vehicles, and communication devices, associated with the responder communication network, in accordance with various aspects and embodiments of the disclosed subject matter. The method 1000 can be employed by, for example, a system that can comprise the RMC, a processor component (e.g., of or associated with the RMC), and/or a data store (e.g., of or associated with the RMC). In some embodiments, the method 1000 can proceed from reference point C associated with the method 700, wherein, in accordance with the method 700, an analysis can be performed on the information associated with the event, the responder communication network, and the communication network, as more fully described herein.

At 1002, based at least in part on the results of the information analysis, a slice (e.g., network, core, or service slice) associated with the communication network and/or a service network can be determined to facilitate providing desirable resources associated with the communication network and/or service network to a communication device associated with the responder communication network in connection with the event. For instance, the RMC (and/or AI component associated therewith) can determine the slice (e.g., network, core, or service slice) associated with the communication network and/or service network, based at least in part on the results of the information analysis, to facilitate providing the desirable (e.g., suitable, reliable, or optimal) resources associated with the communication network and/or service network to the communication device associated with the personnel and/or vehicle, and associated with (e.g., communicatively connected to) the responder communication network, in connection with the event.

At 1004, the slice associated with the communication network and/or service network can be generated and managed, in connection with the event. Based at least in part on the determining of the slice, the RMC can generate and manage (e.g., control) the slice associated with the communication network and/or service network, in connection with the event. Utilizing the slice, the communication device can receive or transmit information using the resources of the slice, wherein the slice can provide desirable QoS, QoE, bandwidth, and/or security with regard to the information communicated via the slice.

Figure 11:
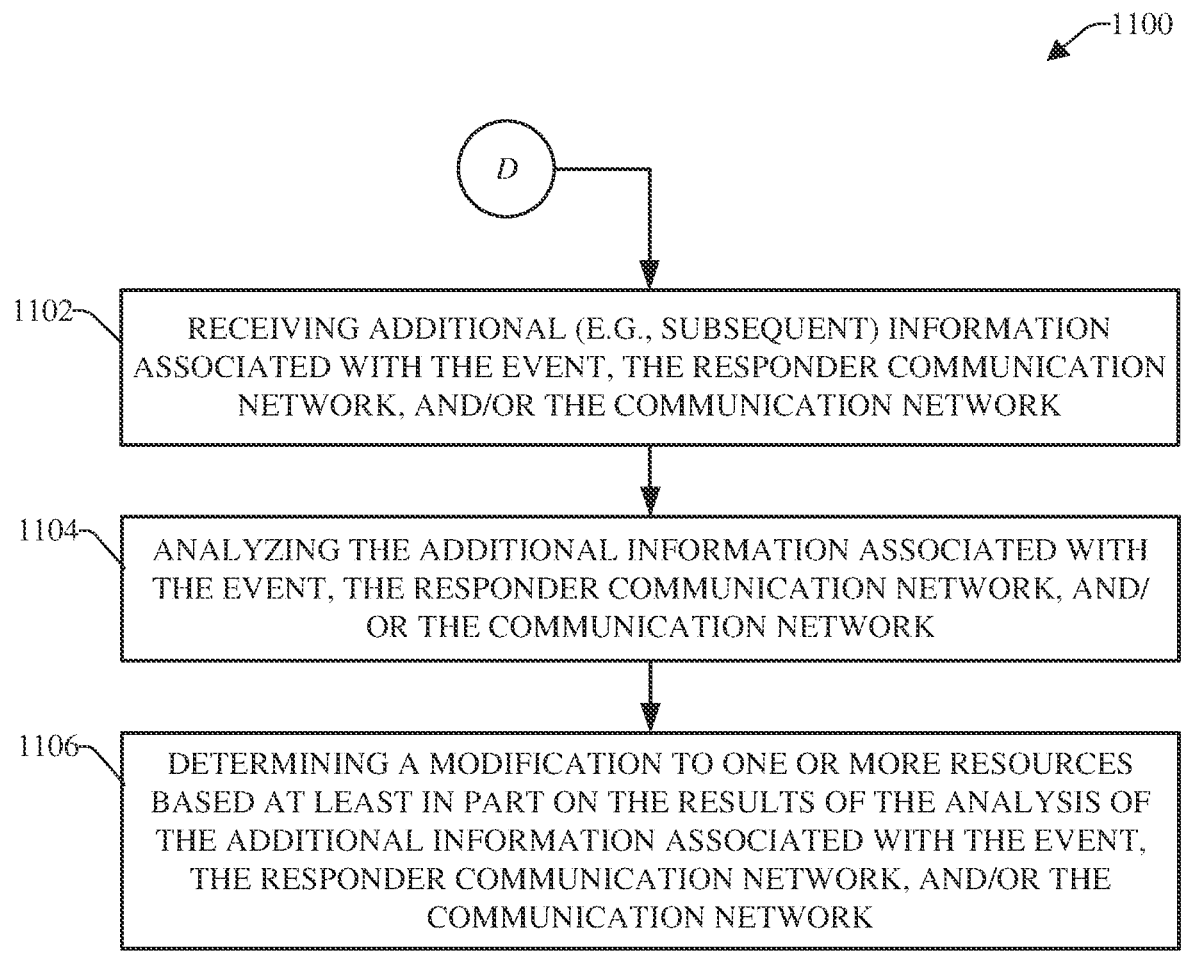
FIG. 11 illustrates a flow chart of an example method that can desirably manage resources, including modifying resources, associated with the responder communication network and/or the communication network, in accordance with various aspects and embodiments of the disclosed subject matter.

FIG. 11 illustrates a flow chart of an example method 1100 that can desirably manage resources, including modifying resources, associated with the responder communication network and/or the communication network, in accordance with various aspects and embodiments of the disclosed subject matter. The method 1100 can be employed by, for example, a system that can comprise the RMC, a processor component (e.g., of or associated with the RMC), and/or a data store (e.g., of or associated with the RMC). In some embodiments, the method 1100 can proceed from reference point D associated with the method 700, wherein, in accordance with the method 700, an analysis can be performed on the information associated with the event, the responder communication network, and the communication network, as more fully described herein.

At 1102, additional (e.g., subsequent) information associated with the event, the responder communication network, and/or the communication network can be received, wherein the additional information can comprise third communication-related information associated with the first network equipment of the responder communication network, fourth communication-related information associated with the second network equipment of the communication network, second condition-related information relating to conditions sensed or captured by sensors or devices in or associated with the geographic area, second other information (e.g., second internal data), and/or second external information associated with the group of external data sources. The RMC can receive the third communication-related information from the first network equipment of the responder communication network. The RMC can receive the fourth communication-related information from the second network equipment. The RMC also can receive the second condition-related information relating to conditions (e.g., environmental or other conditions) sensed or captured by the sensors or the devices (e.g., drones, robotic devices, or other devices) in or associated with the geographic area. In some embodiments, the RMC can receive the second other information (e.g., the second internal data) from one or more internal data sources (e.g., internal databases or other type of internal source) of the communication network. In certain embodiments, the RMC can receive the second external information from the group of external data sources.

At 1104, the additional information associated with the event, the responder communication network, and/or the communication network can be analyzed. In some embodiments, the RMC can analyze the third communication-related information, the fourth communication-related information, the second condition-related information, the second other information, and/or the second external information to facilitate determining management and use (e.g., modifications of the use) of the resources associated with the responder communication network and/or the communication network. In certain embodiments, as part of the information analysis, the RMC can comprise or employ the AI component, wherein the AI component can perform an AI or ML analysis on the additional information (and the previous information) associated with the event, the responder communication network, and/or the communication network. Based at least in part on the results of the AI or ML analysis, the AI component can learn (e.g., self-learn), infer, predict, identify, or desirable utilization (e.g., modification of utilization) of the resources (e.g., location of resources, configuration of resources, amount of resources, or other management of use of resources) in connection with the event, as more fully described herein.

At 1106, a modification to one or more resources can be determined based at least in part on the results of the analysis of the additional information associated with the event, the responder communication network, and/or the communication network. The RMC (and/or AI component) can determine the modification to the one or more resources based at least in part on the results of the analysis of the additional information (and/or previous information) associated with the event, the responder communication network, and/or the communication network. For instance, in connection with the event, based at least in part on the results of the analysis of the additional information (and/or previous information) associated with the event, the RMC (and/or AI component) can determine a modification to a location or configuration of a portable base station, a location or configuration of a sensor, a location or configuration of a device, a travel route of a person or vehicle, or a slice (e.g., a network or service slice) or resources associated with the slice. In connection with the event, the RMC can implement the modification to the one or more resources to desirably modify the one or more resources to facilitate enhancing (e.g., improving, increasing, or optimizing) performance of the resources, the responder communication network, and/or the communication network.

Figure 12:
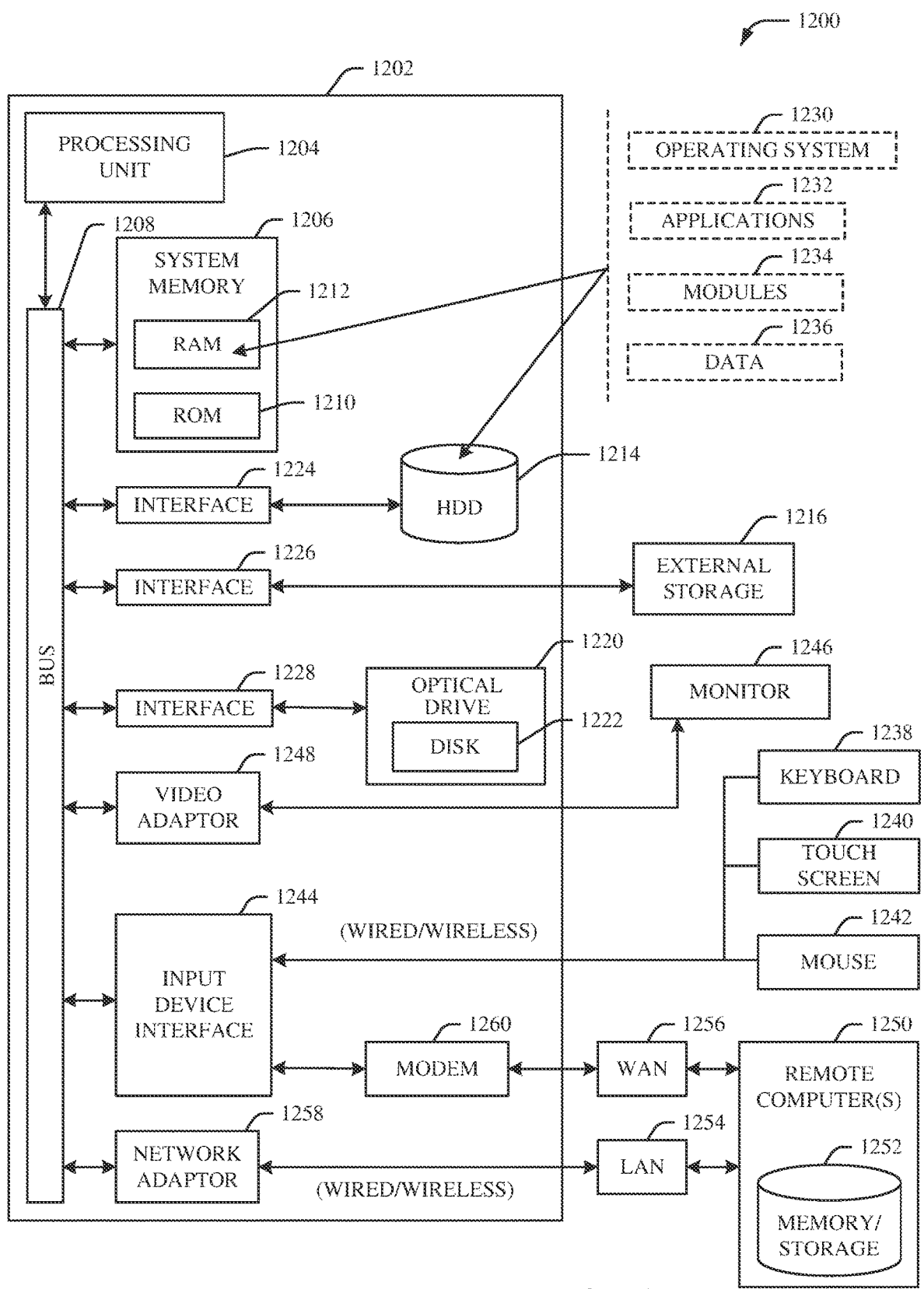
FIG. 12 is a schematic block diagram illustrating a suitable computing environment in which the various embodiments of the embodiments described herein can be implemented.

In order to provide additional context for various embodiments described herein, FIG. 12 and the following discussion are intended to provide a brief, general description of a suitable computing environment 1200 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, or other type of program modules, that can perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, or other type of external storage device) and an optical disk drive 1220 (e.g., which can read or write from a CD-ROM disc, a DVD, a BD, or other type of optical disk drive). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234, and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH™ interface, or other type of interface.

A monitor 1246 or other type of display device can be also connected to the system bus 1208 via an interface, such as a video adapter 1248. In addition to the monitor 1246, a computer typically includes other peripheral output devices (not shown), such as speakers, printers, or other type of peripheral output device.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256, e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, or other type of wirelessly detectable tag), and telephone. This can include Wireless Fidelity (Wi-Fi)

and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, or other versions of IEEE 802.11) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); or other type of wireless telecommunication or radio technology. Additionally, some or all of the aspects described herein can be exploited in legacy telecommunication technologies, e.g., GSM. In addition, mobile as well as non-mobile networks (e.g., the internet, data service network such as internet protocol television (IPTV), or other type of non-mobile network) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, or other type of magnetic storage device), optical discs (e.g., compact disc (CD), digital versatile disc (DVD), blu-ray disc (BD), or other type of optical disc), smart cards, and memory devices comprising volatile memory and/or non-volatile memory (e.g., flash memory devices, such as, for example, card, stick, key drive, or other type of volatile memory and/or non-volatile memory), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., device, communication device, sensor, communication network, responder communication network, base station, portable base station, network equipment, resource management component, resources, slice, virtual dedicated network, service, processor component, data store, or other type of component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   in connection with an event, analyzing, by a system comprising a processor, first communication-related information associated with first network equipment that is associated with a responder communication network, second communication-related information associated with second network equipment that is associated with a communication network, and an item of external information received from an external data source; and based on a result of the analyzing, managing, by the system, a group of resources associated with the responder communication network in connection with the event, wherein the group of resources comprises a portable base station that is able to provide a service in connection with the event.

2. The method of claim 1, wherein the portable base station is movable and modifiable to enable the providing of the service in connection with the event.

3. The method of claim 1, wherein the first network equipment is part of a responder communication network, wherein the second network equipment is part of the communication network that is different than the responder communication network, wherein the analyzing comprises analyzing the first communication-related information, the second communication-related information, and a group of items of external information received from a group of external data sources, comprising the item of external information received from the external data source, wherein the group of items of external information is determined to be relevant to the event, wherein the external data sources are external to and associated with the responder communication network or the communication network, and wherein the managing comprises managing the group of resources associated with the responder communication network in connection with the event, based on the result of the analyzing of the first communication-related information, the second communication-related information, and the group of items of external information.

4. The method of claim 3, further comprising:
based on the result of the analyzing, determining, by the system, a location to place the portable base station in or associated with a geographic area to enable the portable base station to provide the service to a device associated with the responder communication network or the communication network, in connection with the event.

5. The method of claim 4, wherein the group of items of external information is a first group of items of external information, wherein the result is a first result, and wherein the method further comprises:

analyzing, by the system, third communication-related information associated with the first network equipment in connection with the event, fourth communication-related information associated with the second network equipment, or a second group of items of external information received from the group of external data sources; and based on a second result of the analyzing of the third communication-related information, the fourth communication-related information, or the second group of items of external information, determining, by the system, whether to modify a location, or a value of a base station parameter, of the portable base station to enhance performance of the portable base station.

6. The method of claim 5, further comprising:
based on the second result, determining, by the system, that the performance of the portable base station does not satisfy a defined communication quality criterion and, to enhance the performance of the portable base station, the location, or the value of the base station parameter, of the portable base station is to be modified; and in response to determining that the location or the value of the base station parameter of the portable base station is to be modified, directing, by the system, modification of the location, or the value of the base station parameter, of the portable base station.

7. The method of claim 3, wherein the group of items of external information received from the group of external data sources comprises at least one of weather information associated with a weather information source, geographical or map information associated with a geographical or map information source, traffic information associated with a traffic information source, or unmanned traffic management information associated with an unmanned traffic management information source.

8. The method of claim 1, wherein the group of resources comprises sensors that are able to sense environmental conditions associated with a geographic area or mobile devices that are able to detect or capture condition-related information relating to conditions associated with the geographic area, wherein the mobile devices are movable, and wherein the method further comprises:

based on the result of the analyzing, determining, by the system, first locations to position the sensors in or associated with the geographic area, second locations to position the mobile devices in or associated with the geographic area, or a traffic route that a vehicle is to travel in or associated with the geographic area, wherein a sensor of the sensors or a mobile device of the mobile devices is associated with the portable base station.

9. The method of claim 8, wherein a group of items of external information is received from a group of external data sources, comprising the item of external information received from the external data source, and wherein the method further comprises:

receiving, by the system, sensor information relating to the environmental conditions associated with the geographic area from the sensors, environmental condition-related information from the group of external data sources, comprising the external data source, or the condition-related information relating to the conditions associated with the geographic area from the mobile devices, wherein the sensors or the mobile devices are associated with the responder communication network, and wherein the group of items of external information comprises the environmental condition-related information; and predicting, by the system, to a defined level of probability, a change in an environmental condition of the environmental conditions during a future time period based on analyzing the sensor information, the environmental condition-related information, or the condition-related information.

10. The method of claim 9, wherein the first locations comprise a first location of a sensor of the sensors, wherein the second locations comprise a second location of a mobile device of the mobile devices, and wherein the method further comprises:

based on the predicting, to the defined level of probability, of the change in the environmental condition, determining, by the system, whether to modify the first location or a first parameter of the sensor, the second location or a second parameter of the mobile device, or the traffic route that the vehicle is to travel.

11. The method of claim 8, wherein the environmental conditions comprise or relate to at least one of a wind speed, a wind direction, an air quality level, a smoke level, a pollution level, a pollution type, a temperature level, a barometric pressure level, a water level, a wave size, an oxygen level, a carbon dioxide level, a carbon monoxide level, a gas level, a gas type, a chemical level, a chemical type, a contamination level, a parasitic level, a toxin level, an acidic level, a structural condition of a physical structure, or a structural condition parameter value associated with the geographic area.

12. A system, comprising:
a processor; and
a memory that stores executable instructions that, when executed by the processor, facilitate performance of operations, comprising:
evaluating first network-related data associated with first network equipment associated with a responder communication network in connection with an event, second network-related data associated with second network equipment associated with a communication network, and event-related data received from a data source device; and
based on a result of the evaluating, controlling a group of resources associated with the responder communication network, wherein the group of resources comprises a movable base station that facilitates provision of a service in connection with the event.

13. The system of claim 12, wherein the group of resources comprises movable base stations, comprising the movable base station, that are movable and modifiable, and wherein the operations further comprise:
based on the result of the evaluating, determining respective locations to situate the movable base stations in or associated with a geographic region to enable the movable base stations to enable a group of services, comprising the service, to devices associated with the responder communication network or the communication network.

14. The system of claim 12, wherein a group of items of event-related data is received from a group of data source devices, comprising the event-related data received from the data source device, wherein the group of items of event-related data is a first group of items of event-related data, wherein the result is a first result, and wherein the operations further comprise:
evaluating third network-related data associated with the first network equipment and relating to the responder communication network, fourth network-related data associated with the second network equipment and relating to the communication network, or a second group of items of event-related data received from the group of data source devices, wherein the group of data source devices are external to and associated with the responder communication network or the communication network; and
based on a second result of the evaluating of the third network-related data, the fourth network-related data, or the second group of items of event-related data, determining whether to change a location, or a parameter value of a base station parameter, of the movable base station to increase a performance of the movable base station according to a defined performance metric.

15. The system of claim 14, wherein the operations further comprise:
in response to determining that the location, or the parameter value of the base station parameter, of the movable base station is to be changed, initiating a change of the location, or the parameter value of the base station parameter, of the movable base station, wherein the base station parameter comprises or relates to an operational parameter relating to operation of the movable base station, a signal-related parameter relating to transmitted or received communication signals associated with the movable base station, or an antenna-related parameter relating to one or more antennas of the movable base station.

16. The system of claim 12, wherein the operations further comprise:
based on the result of the evaluating, generating a network slice associated with a first device or a second device that is associated with the movable base station associated with the responder communication network or the second network equipment associated with the communication network, wherein the group of resources comprises a group of network slice-related resources associated with the network slice; and
controlling the network slice to have a bandwidth or a latency that satisfies a defined communication quality criterion.

17. The system of claim 12, wherein the result is a first result,
wherein the evaluating comprises evaluating, utilizing a trained artificial intelligence model, the first network-related data, the second network-related data, or the event-related data, and
wherein the controlling of the group of resources associated with the responder communication network comprises controlling the group of resources associated with the responder communication network in connection with the event based on a second result of the evaluating, and utilizing the trained artificial intelligence model.

18. The system of claim 12, wherein the group of resources comprises sensors usable to sense environmental conditions associated with a geographic region or devices usable to detect or capture condition-related data relating to conditions associated with the geographic region, wherein the sensors or the devices are movable or modifiable, and wherein the operations further comprise:
based on the result of the evaluating, determining first locations to place the sensors in or associated with the geographic region, second locations to position the devices in or associated with the geographic region, or a traffic route that a vehicle is to travel in or associated with the geographic region, wherein a sensor of the sensors or a device of the devices is associated with the movable base station.

19. A non-transitory machine-readable medium, comprising executable instructions that, when executed by a processor, facilitate performance of operations, comprising:
analyzing first network-related data associated with first network equipment of a responder communication network in connection with an event, second network-related data associated with second network equipment of a communication network, and event-related data received from a group of external data sources; and
based on a result of the analyzing, controlling a group of resources associated with the responder communication network in connection with the event, wherein the group of resources comprises an item of mobile network equipment that enables provision of a service in connection with the event.

20. The non-transitory machine-readable medium of claim 19, wherein the group of resources comprises sensors usable to sense environmental conditions associated with a geographic area associated with the event, mobile devices usable to detect or capture condition-related data relating to conditions associated with the geographic area, or items of mobile network equipment, comprising the item of mobile network equipment, wherein the sensors, the mobile devices, or the items of mobile network equipment are movable or configurable, and wherein the operations further comprise:

based on the result of the analyzing, determining first locations to place the sensors in or associated with the geographic area, second locations to position the mobile devices in or associated with the geographic area, third locations to position the items of mobile network equipment in or associated with the geographic area, or a traffic route that a vehicle is to travel in or associated with the geographic area, wherein a sensor of the sensors or a mobile device of the mobile devices is associated with the item of mobile network equipment.

* * * * *